United States Patent
Arase et al.

(10) Patent No.: US 11,905,116 B2
(45) Date of Patent: Feb. 20, 2024

(54) CONTROLLER AND CONTROL METHOD FOR ROBOT SYSTEM

(71) Applicant: Mujin, Inc., Tokyo (JP)

(72) Inventors: Isamu Arase, Tokyo (JP); Satoshi Tendo, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 17/360,685

(22) Filed: Jun. 28, 2021

(65) Prior Publication Data

US 2021/0339955 A1 Nov. 4, 2021

Related U.S. Application Data

(63) Continuation of application No. 16/739,971, filed on Jan. 10, 2020, now Pat. No. 11,046,518.
(Continued)

(30) Foreign Application Priority Data

Oct. 15, 2019 (JP) .................................. 2019-188774

(51) Int. Cl.
*G06F 7/00* (2006.01)
*B65G 1/137* (2006.01)

(52) U.S. Cl.
CPC .................................. *B65G 1/1373* (2013.01)

(58) Field of Classification Search
CPC ..... B65G 1/1373; G06Q 10/08; B25J 9/0093; B25J 19/021; B25J 9/1602; B25J 9/1679
(Continued)

(56) References Cited

U.S. PATENT DOCUMENTS 9,428,336 B2 8/2016 Hagen et al.
9,827,683 B1 * 11/2017 Hance ................ G05B 19/4189
(Continued)

FOREIGN PATENT DOCUMENTS

CA 3029834 A1 1/2018
CN 1903522 A 1/2007
(Continued)

OTHER PUBLICATIONS

Japan Patent Office Decision to Grant dated Feb. 9, 2021 for Japanese patent application No. 2020-521934, Applicant: MUJIN, Inc., 3 pages.
(Continued)

*Primary Examiner* — Yolanda R Cumbess
(74) *Attorney, Agent, or Firm* — Perkins Coie LLP

(57) ABSTRACT

A robot system controller and control method that implement sophisticated cooperation among units is provided. The controller may include: a data acquisition unit adapted to acquire first data including information about the handling object and the shelf before storing or retrieving the handling object in/from the shelf; a data storage unit; and a robot control unit adapted to select and transport the shelf to an access position before storing or retrieving the handling object in/from the shelf, create or acquire a control sequence for storing or retrieving the handling object in/from the shelf, instruct the transport robot to execute a task of transporting the shelf to the access position, and instruct the handling robot to execute a task of storing or retrieving the handling object in/from the shelf.

19 Claims, 12 Drawing Sheets

Related U.S. Application Data

(60) Provisional application No. 62/792,348, filed on Jan. 14, 2019.

(58) Field of Classification Search
USPC .......................................... 700/213–216, 218
See application file for complete search history.

(56) References Cited

U.S. PATENT DOCUMENTS

| | | | |
|---|---|---|---|
| 10,029,851 | B1 | 7/2018 | Durham et al. |
| 10,108,185 | B1 | 10/2018 | Theobald |
| 10,442,607 | B2 | 10/2019 | Rudolf |
| 10,860,978 | B1* | 12/2020 | Aggarwal .......... G05B 19/4183 |
| 10,953,544 | B2 | 3/2021 | Diankov et al. |
| 11,046,518 | B2 | 6/2021 | Arase et al. |
| 11,124,401 | B1* | 9/2021 | Jarvis .................. G05D 1/0234 |
| 2008/0167884 | A1 | 7/2008 | Mountz et al. |
| 2010/0312388 | A1 | 12/2010 | Jang et al. |
| 2016/0129592 | A1 | 5/2016 | Saboo et al. |
| 2016/0236867 | A1 | 8/2016 | Brazeau et al. |
| 2016/0325933 | A1 | 11/2016 | Stiernagle |
| 2016/0325934 | A1 | 11/2016 | Stiernagle |
| 2016/0327941 | A1 | 11/2016 | Stiernagle |
| 2017/0021502 | A1 | 1/2017 | Nusser et al. |
| 2017/0100837 | A1 | 4/2017 | Zevenbergen et al. |
| 2017/0136632 | A1 | 5/2017 | Wagner et al. |
| 2017/0158430 | A1 | 6/2017 | Raizer |
| 2017/0225330 | A1 | 8/2017 | Wagner et al. |
| 2017/0233188 | A1 | 8/2017 | Tai |
| 2017/0278047 | A1 | 9/2017 | Welty et al. |
| 2018/0086572 | A1 | 3/2018 | Kimoto et al. |
| 2018/0154399 | A1 | 6/2018 | Wagner et al. |
| 2018/0215541 | A1 | 8/2018 | Belardinelli et al. |
| 2018/0218185 | A1* | 8/2018 | High .................. G06Q 10/087 |
| 2018/0276604 | A1 | 9/2018 | Gariepy et al. |
| 2019/0361672 | A1 | 11/2019 | Ohdner et al. |
| 2020/0094997 | A1 | 3/2020 | Menon et al. |
| 2020/0095063 | A1 | 3/2020 | Liu |
| 2020/0223066 | A1 | 7/2020 | Diankov et al. |
| 2021/0170596 | A1 | 6/2021 | Diankov et al. |

FOREIGN PATENT DOCUMENTS

| | | |
|---|---|---|
| CN | 101508112 A | 8/2009 |
| CN | 105773627 A | 7/2016 |
| CN | 106346504 A | 1/2017 |
| CN | 106671085 A | 5/2017 |
| CN | 106956883 A | 7/2017 |
| CN | 107111307 A | 8/2017 |
| CN | 107775635 A | 3/2018 |
| CN | 107962549 A | 4/2018 |
| CN | 108292384 A | 7/2018 |
| CN | 108349083 A | 7/2018 |
| CN | 108778634 A | 11/2018 |
| CN | 108960506 A | 12/2018 |
| CN | 109048837 A | 12/2018 |
| CN | 109132313 A | 1/2019 |
| CN | 107885901 A | 2/2020 |
| JP | 61155125 A | 7/1986 |
| JP | H02091713 U | 7/1990 |
| JP | 2012116651 A | 6/2012 |
| JP | 2015196600 A | 11/2015 |
| JP | 2017132641 A | 3/2017 |
| JP | 2018507829 A | 3/2018 |
| JP | 2018520967 A | 8/2018 |
| JP | 2018126273 A | 4/2020 |
| JP | 2018150124 A | 4/2020 |
| JP | 2018520957 A | 4/2020 |
| WO | 2017090108 A1 | 6/2017 |
| WO | 2018038816 A1 | 3/2018 |

OTHER PUBLICATIONS

Japan Patent Office Notice of Reasons for Rejection dated Jan. 12, 2021 for Japanese patent application No. 2020-521934, Applicant: MUJIN, Inc., 7 pages.

USPTO Non-Final Office Action dated May 6, 2020 for U.S. Appl. No. 16/740,251, filed Jan. 10, 2020, First Inventor: Rosen Nikolaev Diankov, 36 pages.

USPTO Notice of Allowance dated Feb. 8, 2021 for U.S. Appl. No. 16/740,251, filed Jan. 10, 2020, First Inventor: Rosen Nikolaev Diankov, 11 pages.

USPTO Notice of Allowance dated Nov. 3, 2020 for U.S. Appl. No. 16/740,251, filed Jan. 10, 2020, First Inventor: Rosen Nikolaev Diankov, 6 pages.

USPTO Final Office Action dated Aug. 27, 2020 for U.S. Appl. No. 16/740,251, filed Jan. 10, 2020, First Inventor: Rosen Nikolaev Diankov, 38 pages.

Korea International Search Authority, International Search Report and Written Opinion dated May 14, 2020 for PCT/US2020/013171 filed Jan. 10, 2020, 11 pages.

Japan Patent Office, Decision to Grant for Japanese patent application No. 2019-188774, dated Jun. 18, 2020, and translation thereof, 6 pages.

Japan Patent Office, Decision of Rejection for Japanese patent application No. 2019-188774, dated Feb. 4, 2020, and translation thereof, 2 pages.

Japan Patent Office, Decision of Dismissal of Amendment for Japanese patent application No. 2019-188774, dated Jan. 31, 2020, and translation thereof, 6 pages.

Japan Patent Office, Final Notice of Reasons for Rejection for Japanese patent application No. 2019-188774, dated Dec. 20, 2019, and translation thereof, 9 pages.

Japan Patent Office, Notice of Reasons for Rejection for Japanese patent application No. 2019-188774, dated Nov. 12, 2019, and translation thereof, 12 pages.

USPTO Non-Final Office Action dated Nov. 12, 2020 for U.S. Appl. No. 16/739,971, filed Jan. 10, 2020, First Inventor: Isamu Arase, 32 pages.

USPTO Notice of Allowance dated Feb. 19, 2021 for U.S. Appl. No. 16/739,971, filed Jan. 10, 2020, First Inventor: Isamu Arase, 16 pages.

USPTO Notice of Allowance dated May 4, 2021 for U.S. Appl. No. 16/739,971, filed Jan. 10, 2020, First Inventor: Isamu Arase, 10 pages.

International Bureau of WIPO, International Preliminary Report on Patentability dated Jul. 29, 2021 for PCT/US2020/013171 filed Jan. 10, 2020, 7 pages.

CIPO Decision to Grant dated Aug. 30, 2021 for Chinese Patent Application No. 202010502656.9, 4 pages.

CIPO Office Action dated Apr. 27, 2021 for Chinese Patent Application No. 202010502656.9, 15 pages.

Product Information, Logistics Warehouse Planners, FUJITEX Corporation, Tokyo, Japan, https://lplanners.jp/products/, last accessed on Dec. 14, 2021, 4 pages.

* cited by examiner

CONTROLLER AND CONTROL METHOD FOR ROBOT SYSTEM

CROSS-REFERENCE TO RELATED APPLICATIONS

This application is a continuation of U.S. patent application Ser. No. 16/739,971, filed Jan. 10, 2020, which claims the benefit of U.S. Provisional Patent Application Ser. No. 62/792,348, filed Jan. 14, 2019, and Japanese Patent Application No. 2019-188774, filed Oct. 15, 2019, all of which are incorporated herein by reference in their entireties.

This application contains subject matter related to U.S. patent application Ser. No. 16/740,251, filed Jan. 10, 2020, now U.S. Pat. No. 10,953,544 issued on Mar. 23, 2021, titled "ROBOTIC SYSTEM WITH COORDINATION MECHANISM AND METHODS OF OPERATING THE SAME," which is incorporated herein by reference in its entirety.

TECHNICAL FIELD

The present technology is directed generally to robotic systems and, more specifically, a control mechanism.

BACKGROUND

Many robots (e.g., machines configured to automatically/independently perform physical operation) currently enjoy wide use in many fields because of their ever-improving performance and falling costs. For example, robots can be used to perform various operations such as maneuvering and transferring objects for production, assembly, packing/packaging, transportation, and the like. In performing operations, robots can repeat human motions, thereby taking over or reducing dangerous or repetitive human operations.

As an example of such robotic system, Japanese Patent Laid-Open No. 2018-167950 proposes an automatic logistics system equipped with a transport container storage mechanism. The transportation container storage mechanism is adapted to temporarily store a transport container for automating processes for warehouse operations and shipping operations. The automatic logistics system automatically transfers items from the transport container to a shipment container based on shipping information.

However, in spite of technological advancement, in many cases, robots lack sophistication needed to reproduce a human-involved operation in carrying out a larger and/or more complicated task. Therefore, automation and functional expansion of robot systems are still insufficient and currently fails to eliminate human involvement. Currently required human operations reduce overall efficiency. Consequently, there is still a need for technological improvements in order to manage various motions and/or interactions among robots and further promote automation and functional expansion of the robot systems. Thus, a robot system controller and robot system control method that implement, for example, sophisticated cooperation among units including robots is desired.

SUMMARY OF THE INVENTION

To solve the above problem, the technology described below adopts the following configurations.

[1] A controller according to the present technology controls a robot system including a handling robot adapted to handle an object to store the object in a shelf and/or retrieve (take out) the object from the shelf, and a transport robot adapted to transport the shelf, where the handling robot handles the object using a robot arm, end effector, and the like. Examples of the handling robot includes a fetching robot, devanning robot, and piece-picking robot. The controller comprises (1) a data acquisition unit adapted to acquire first data including information about the object and information about the shelf before storing the object in the shelf and/or retrieving the object from the shelf; (2) a data storage unit adapted to store the first data; and (3) a robot control unit adapted to select and transport the shelf to an access position based on the first data before storing the object in the shelf and/or retrieving the object from the shelf, create or acquire a control sequence for storing the object in the shelf and/or retrieving the object from the shelf, and based on the control sequence, instruct the transport robot to execute a task of transporting the shelf to the access position and instruct the handling robot to execute a task of storing the object in the shelf and/or retrieving the object from the shelf.

Here, the "object" is an object handled by the handling robot provided in the robot system and includes, for example, one or more items or a container (e.g., a bin, storage container, or box) that contains the items or has the items placed thereon. The container may be either packed or unpacked. Also, part of (e.g., a top face) the container may be open (e.g., an "open-top" container). Also, according to other embodiments and examples, the "object" may be handled or transferred with respect to a shelf, pallet, conveyor, and temporary storage area. The "shelf," which may be transported by the transport robot of the robot system, is a structure including one or more shelves and capable of holding at least one or more objects thereon. Furthermore, the "information about the object" and "information about the shelf" are information associated with identification of the object and the shelf, respectively. Also, the "access position" of the "shelf" is a position at which the handling robot can access the shelf. Furthermore, the "control sequence" is an operating sequence that includes a set of controls that cause one or more units (e.g., the handling robot and transport robot) provided in the robot system to execute individual tasks. The term "before" means that something is taking place at or prior to a given time point and the term "after" means that something is taking place at or subsequent to a given time point.

In some embodiments, before storing the object on the shelf and/or before retrieving the object from the shelf, information about the object and information about the shelf are obtained and a task is executed based on the control sequence created according to the first data including the information. This makes it possible to efficiently and smoothly perform the operation of storing the object in the shelf and/or the operation of retrieving the object from the shelf. To provide the increased efficiency and smooth performance, cooperation among the units in the robot system, and especially sophisticated cooperation between the handling robot and transport robot can be coordinated, thereby expanding the functionality of the robot system.

[2] In the above configuration, the data acquisition unit may acquire second data including the information about the object and the information about the shelf after the object is stored in the shelf and/or after the object is retrieved from the shelf; and the data storage unit may store the second data.

With this configuration, information about the object and information about the shelf can be grasped after the object is stored in the shelf and/or after the object is retrieved from the shelf. This makes it possible to keep track of a state or situation of the shelf reliably after the object is stored and/or after the object is retrieved.

[3] In the above configuration, the robot control unit may create or acquire the control sequence based on the second data such that the object is placed in a concentrated manner in the shelf.

With this configuration, the second data can be used to provide available space information (availability information for subsequent placements) about the shelf after a preceding object is stored in the shelf and/or retrieved from the shelf. Thus, in a next stage, the shelf can be selected efficiently in storing (filling) the object on (into) the shelf and/or retrieving the object from the shelf. This makes it possible to increase storage efficiency of the shelf and prevent the shelf from being cluttered with useless spaces (defragmentation). Also, the configuration makes it possible to reduce such useless spaces and makes it easier to collectively manage positional information about the object and the shelf.

[4] In the above configuration, the robot control unit may instruct the handling robot to perform at least part of operations in the control sequence before the shelf reaches the access position.

With this configuration, while the transport robot is transporting the shelf to the access position (i.e., before the shelf arrives at the access position), the handling robot can store or retrieve the object in advance. This enables more sophisticated cooperation, making it possible to reduce task completion times.

[5] In the above configuration, the data acquisition unit may acquire relative positional information about the transport robot and the shelf; and the robot control unit may correct positional information about the shelf at the access position based on the relative positional information, and create or acquire the control sequence based on the corrected positional information.

With this configuration, when the handling robot accesses the shelf, the shelf and/or the transport robot may be used as a reference for motions. Accordingly, misalignment between the shelf and the transport robot holding the shelf can be corrected. This allows the handling robot to more accurately perform the operations for storing the object on the shelf and/or retrieving the object from the shelf, resulting in improvement of operating accuracy and operating efficiency.

[6] In the above configuration, the shelf may be configured such that the object is stored and/or retrieved in a lateral direction and a safety catcher for the object may be installed in an end portion of the shelf; the handling robot may grip the object from the lateral direction (e.g., a devanning gripper can be used, where devanning is the operation of unloading, e.g., from a storage/shipping container); and the robot control unit may create or acquire the control sequence such that the object moves over the safety catcher. Note that the "end portion of the shelf" is a peripheral edge of an upper surface of each shelf board of the shelf, an entire circumference in a neighborhood of the peripheral edge, or part of the entire circumference, or such a position where at least part of the object such as an item interferes with at least part of the safety catcher, with the object placed on the shelf board.

With this configuration, the safety catcher installed on each shelf board of the shelf prevents the object placed on the shelf board from falling off the shelf. Also, the object is gripped by the handling robot from the lateral direction and stored in and/or retrieved from the shelf in the lateral direction. Therefore, even if the shelf is a multi-tiered shelf having plural shelf boards, the object can be stored in and/or retrieved from the shelf easily. In so doing, since the handling robot moves the object by avoiding (moving over) the safety catcher, the object can be stored in and/or retrieved from the shelf smoothly and reliably.

[7] In the above configuration, the data storage unit may store positional information (e.g., layout information) about a plurality of the objects on the shelf as two-dimensional information or three-dimensional information for each object or for each shelf board of the shelf.

With this configuration, positions of the objects placed on the shelf can be grasped for each object or for each shelf board (the latter case can also be said to be on a layer by layer basis). Also, the layout of the plural objects can be managed collectively as one-dimensional information or three-dimensional information on each shelf board or across different shelf boards. Thus, for example, if one object is pinpointed, the objects stored on the same shelf board of the shelf or the objects stored on the shelf can be pinpointed all at once. This makes it possible to improve operating efficiency, for example, by reducing resources needed for inventory control and stocktaking.

[8] In the above configuration, the robot system may further include a sensor adapted to image the shelf storing the object. The robotic system may allow the sensor to measure identification information (a code or a tag representing the identification information) about the object, the robot control unit may create or acquire the control sequence for storing the object on the shelf.

With this configuration, the robotic system may use the sensor to determine the identification information of objects stored on the shelf. In this case, for objects having the identification information accessible via a side surface, the objects may be placed with identification information exposed so as to be visible from an outer side of the shelf board. The identification information attached to the stored object may be recognized by a sensor, such as a camera. Thus, objects stored on the shelf can be easily identified and determined. In so doing, if positional information about objects stored on the shelf are stored in advance as two-dimensional information or three-dimensional information as with [7] above, by pinpointing one object, the objects stored on the shelf can be pinpointed for each shelf board or shelf more easily and simply all at once. This makes it possible to further improve operating efficiency in inventory control and stocktaking.

[9] In this case, more specifically, the robot system may further include a sensor adapted to image the shelf storing the object; and the sensor may image the shelf when the transport robot holding the shelf is at rest or when the transport robot holding the shelf is moving.

[10] In the above configuration, the robot control unit may generate a flag that storage of the object on the shelf and/or retrieval of the object from the shelf will be complete, before the storage of the object in the shelf and/or the retrieval of the object from the shelf are/is finished.

With this configuration, at a stage before storage of the object in the shelf and/or retrieval of the object from the shelf are/is finished, the flag can indicate the upcoming completion. Thus, an operation of a task executed in a next stage can be started smoothly on a timely basis, enabling more sophisticated cooperation among units by reducing work delays.

[11] In the above configuration, the data acquisition unit may acquire actually measured values or estimated values of the information about the object and/or the information about the shelf. Consequently, the position of the object inside/outside the shelf, the position of the shelf, and the position of the identification information attached to the object can be checked by actually measuring with a sensor such as a camera or estimated, for example, based on a master data even if not actually measured.

[12] A logistics system according to the present technology comprises: the controller according to any one of the above configurations; and a robot system including the handling robot and the transport robot.

[13] In the above configuration, the controller may identify the robot system and a region related to the robot system and calculate tasks (including a unit task and a task made up of a combination of a plurality of unit tasks) based on the control sequence; and the tasks may include a task related to conveyance of the shelf and handling of the object by the robot system and a plurality of tasks executed by the robot system across adjacent and/or overlapping regions.

[14] A program according to the present technology causes a computer to function as the controller of any one of the above configurations.

[15] A recording medium according to the present technology is a computer-readable non-transitory recording medium on which the above program is recorded.

[16] A control method according to the present technology is a control method for a robot system including a handling robot adapted to handle an object to store the object on a shelf and/or retrieve the object from the shelf, and a transport robot adapted to transport the shelf, the control method being performed by a controller having a data acquisition unit, a data storage unit, and a robot control unit. With this method, (1) the data acquisition unit acquires first data including information about the object and information about the shelf before storing the object on the shelf and/or retrieving the object from the shelf; (2) the data storage unit stores the first data; and (3) the robot control unit selects and transports the shelf to an access position based on the first data before storing the object on the shelf and/or retrieving the object from the shelf, creates or acquires a control sequence for storing the object on the shelf and/or retrieving the object from the shelf, and based on the control sequence, instructs the transport robot to execute a task of transporting the shelf to the access position and instructs the handling robot to execute a task of storing the object on the shelf and/or retrieving the object from the shelf.

DETAILED DESCRIPTION

Figure 1:
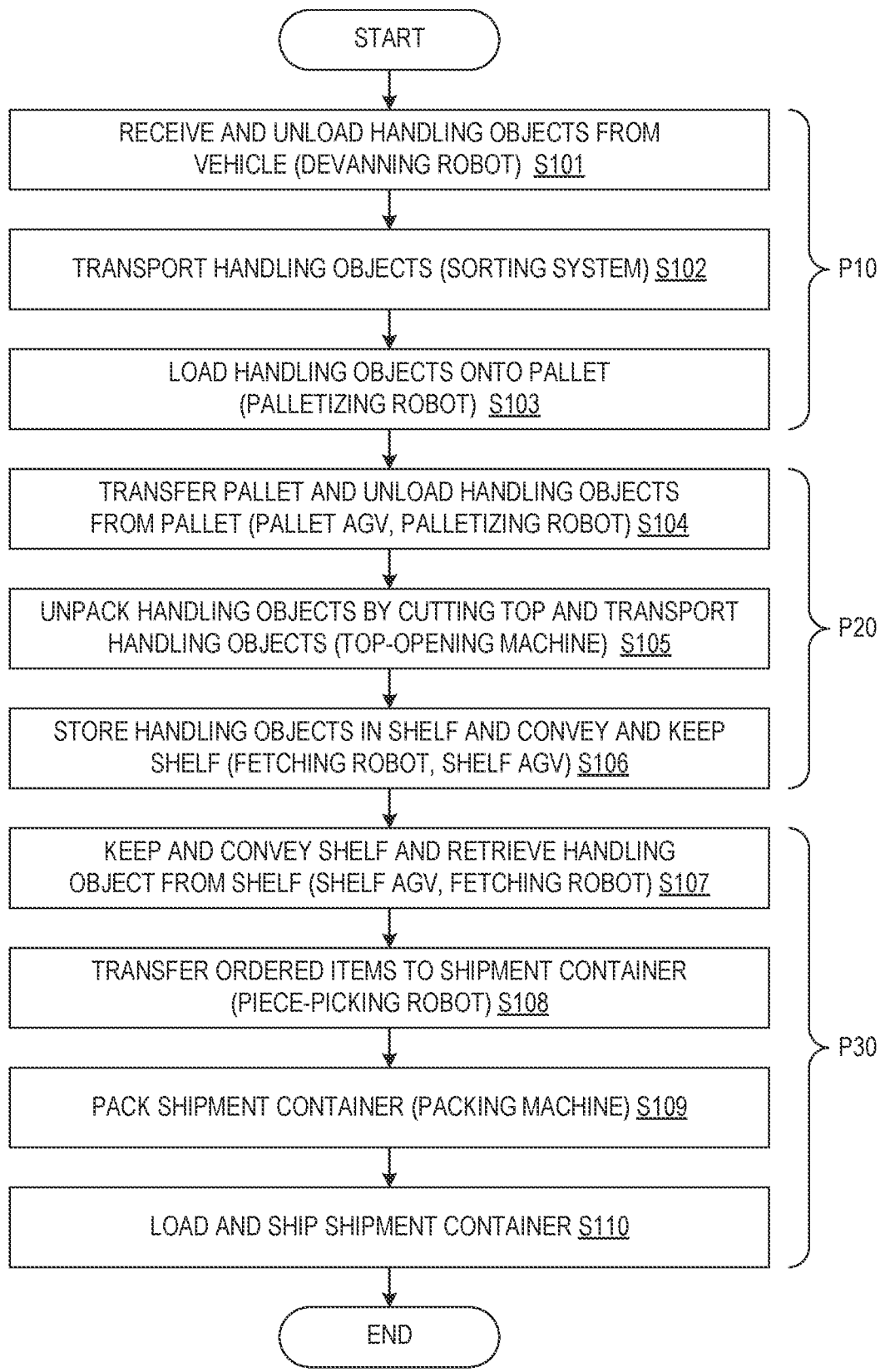
FIG. 1 is a schematic flowchart showing an example work sequence for a robot system according to one embodiment of the present technology.

The present technology provides a robot system in which multiple units (e.g., various robots, various devices, a controller provided integrally therewith or separately therefrom) are integrated/coordinated in a sophisticated manner through a controller for the robot system, a logistics system equipped therewith, a method therefor, and the like. That is, a robot system according to an embodiment of the present technology is an integrated system capable of autonomously executing, for example, one or more tasks.

Here, "tasks" can include, for example, a task in which a robot and the like access objects. The tasks may include moving the objects from one place to another, such as for storing, keeping, retrieving, and organizing the objects. The tasks may be for classifying or reorganizing the objects into plural groups. The tasks may be for imaging, recording (e.g., for stock-keeping) and managing the objects.

Also, "tasks" can include, combinations or sequences of unit or sub tasks executed during storage of objects (via, e.g., receiving conveying, palletizing (loading), depalletizing (unloading), housing, etc.), restocking or repackaging objects (unpacking, filling, replenishment, etc.), and shipping of objects (retrieving, picking, packing, loading, palletizing, etc.) in a logistics system. Furthermore, "tasks" can include, for example, gripping or lifting objects at a specified position, moving objects on a specified path, and releasing, putting down, or placing objects at a specified position in order to rearrange, regrip, or replace the objects.

Furthermore, the robot system according to the present technology can access objects, for example, via plural units (e.g., a handling robot and/or a transport robot) and to automate processes for warehouse storage and/or shipping. Furthermore, the robot system according to the present technology can classify (group) objects as appropriate, move or place the objects to/at desired positions or specified positions, access the objects, relocate or reclassify the objects in the place or in other places, or rearrange or replace the objects according to characteristics of the objects. In this case, the robot system can read one or more pieces of identification information (e.g., a bar code or Quick Response (QR) code (registered trademark)) attached to one or more specific positions or surfaces of the objects, check the identification information against master data as required, thereby identifying and/or locating the objects, and acquire information associated with the objects.

Furthermore, the robot system according to the present technology can be equipped with a sensor (e.g., an imaging sensor) to identify positions and states (e.g., poses including orientations) of objects and/or a surrounding environment of the objects. The imaging sensor can acquire images of working positions (e.g., locations and/or orientations of the objects including a pick-up position, a drop position, and a position midway on a path) for the tasks executed by individual units of the robot system and images of the objects at the working positions. Also, the robot system according to the present technology can process images of the objects in a predetermined order (e.g., from top to bottom, from a lateral edge, or from an inner side of the object). In so doing, by identifying and classifying outer shapes and environments of the objects (based on, e.g., colors of adjacent pixels, brightness, and changes in those values on the images of the objects), states and situations of the images of the objects can be determined as appropriate.

The robot system according to the present technology can acquire and execute a control sequence for executing a task of accessing and objects, a task of transporting, moving, placing, storing, and otherwise manipulating the objects, and other tasks. The control sequence can include a combination of basic control sequences for driving operative mechanisms of the respective units. The robot system can create or acquire a control sequence for executing various tasks, for example, via machine learning such as motion planning or deep learning.

A conventional robot system used in a typical logistics system, in executing tasks related to warehousing, stocking, or shipping of objects, cannot perform sophisticated interaction among plural units. As a result, operator support is necessary during transition between different tasks executed successively. Also, while the conventional robot system can access, objects in response to an order, it is often necessary for the operator to group the ordered goods or place them in a sequence. Furthermore, conventional robot system present difficulties associated with changing the robotic units or operating procedures for the objects. Such difficulties are further amplified when the replaced units perform tasks that require operator intervention and support due to difficulties associated with changing a control sequence.

Also, as a basic control sequence, the conventional robot system executes a task of gripping an object at one position, moving to another position in this state, and releasing the object. However, by using only such basic operations, storage efficiency for objects and operating efficiency of each unit are limited. Increasing the storage efficiency for objects, often requires operator intervention and support (adjustment, redo, supplementation, system stop, etc.).

In contrast, the robot systems according to various aspects of the present technology can adjust and control interaction among separate units (e.g., the handling robot and transport robot) in executing tasks and promote cooperation among different units unlike conventional robots. Consequently, the operator intervention and support needed conventionally is reduced or eliminated, and the storage efficiency for objects, operating efficiency, and economy can be improved.

Also, the robot system according to the present technology can reliably identify an operating range, a motion path, positions and states of objects, or a combination thereof concerning each unit, and execute tasks smoothly across different units. In so doing, being able to optimize the storage efficiency for objects based on shape information, identification information, positional information, and other similar information about the objects, the robot system can further increase efficiency of space usage. Therefore, the robot system according to the present technology can create or acquire, and execute one or more algorithms configured to place tasks of different units in order, one or more protocols for controlling interaction among separate units, and a suitable control sequence that can implement sophisticated cooperative motions among various units based on information about the states of objects.

Embodiments according to one or more examples of the present technology will be described below with reference to the accompanying drawings. However, the embodiments described below are merely examples, and various modifications and technical applications not mentioned hereinafter are not intended to be excluded. That is, the example of the present technology can be implemented in various modified forms without departing from the spirit and scope of the present technology. Also, in the following drawings identical or similar parts are denoted by the same or similar reference numerals, and the drawings are schematic and do not necessarily represent actual sizes, ratios or the like. Furthermore, the drawings may not be shown in their true size relations. Also, the embodiments described below are part of the embodiments of the present technology rather than all the embodiments of the present technology. Furthermore, any other embodiment obtained by those skilled in the art based on embodiments of the present technology without the need for creative activities is included in the scope of protection of the present technology.

Also, in each embodiment, technique introduced herein can be carried out without particular details of the technique. Furthermore, detailed description of well-known functions such as specific functions or routines is omitted to avoid making the present technology unnecessarily difficult to understand. Besides, detailed description of well-known structures or processes often associated with robot systems and subsystems may also be omitted for the sake of clarification. Reference to "an embodiment," "one embodiment," or the like herein means that a specific feature, structure, material, or characteristic is included in at least one embodiment of the present technology. Therefore, the mention of such a phrase herein does not necessarily refers to the same embodiment. On the other hand, such references are not always mutually exclusive. Furthermore, a specific feature, structure, material, and characteristic can be combined in any appropriate manner in one or more embodiment. It should be understood that various illustrated embodiments are presented only in an explanatory manner and are not necessarily shown in their true scales.

Also, many embodiments or aspects of the present technology include processes, steps, routines, blocks, and the like executed by a programmable computer or controller (controller) and take the form of commands executable by the computer or controller. It should be understood by those skilled in the art that the described technique can be implemented by a system of computers or controller other than those shown in the embodiments. The technique described herein can be carried out in a special-purpose computer or data processor programmed, configured, or built to execute one or more computer-executable commands described below.

Thus, the terms "computer" and "controller" generally used herein include any data processor as well as an Internet-enabled apparatus and a hand-held device (including palmtop computers, wearable computers, cellular or mobile phones, multi-processor systems, processor-based or programmable household electric appliances, network computers, and minicomputers). Information handled by the computer and controller can be provided to any appropriate display media including, for example, a liquid crystal display (LCD).

Commands issued to execute tasks executable by the computer or the controller can be stored in hardware, firmware, or an appropriate computer-readable non-transitory recording medium including a combination of hardware and firmware. Also, each command can be included, for example, in any appropriate memory device including a flash drive and/or other appropriate medium.

"Coupled," "connected," and other similar terms may be used to describe structural relationships among components. However, it is not intended that these terms are interchangeable. Specifically, in specific embodiments, the term "connected" can be used to indicate that two or more elements are in direct contact with one another. Unless otherwise understood clearly from the context, the term "coupled" can be used to indicate that two or more elements are in contact with one another either directly (by involving intervening elements among them) or indirectly, indicate that two or more elements collaborate or interact one another (such as when the elements are in a cause-and-effect relationship as in the case of signal transmission/reception or a function call), or indicate both states.

Application Example

FIG. 1 is a schematic flowchart showing an example work sequence of a logistics system including a robot system according to one embodiment of the present technology. The work sequence includes, for example, a warehousing process P10 of receiving objects (e.g., containers such as carton and/or boxes containing items) into a distribution center or the like. The work sequence may further include a replenishment process P20 of replenishing, for example, a shelf or the like with objects that are placed, for example, on a pallet or the like and storing the objects. The work sequence may further include a shipping process P30 for picking up and shipping ordered items from the objects on the shelf.

In the warehousing process P10, at block S101, objects are received from a transport vehicle or the like. The objects may be received and then unloaded using, for example, a devanning robot. At block S102, using, for example, a sorting system, the objects are transferred on a conveyor or the like to a position that has reloading pallets designated for the objects. At block S103, the transferred objects are loaded, for example, onto an appropriate reloading pallet by a palletizing robot.

In the replenishment process P20, At block S104, the pallet with the objects placed thereon are transported (using, e.g., a pallet automated guided vehicle (AGV) configured to move pallets by carrying or lifting them) to a position. The transported position (e.g., destination) may be where objects are unpacked and unloaded from the pallet, for example, by a depalletizing robot. At block S105, the objects are unpacked (via, e.g., a top-opening machine) by cutting and thereby opening the top of the objects. The opened objects may be transported by a conveyor or the like to a position that has storage shelves designated for the objects. Next, at block S106, the objects are stored in an appropriate position of one or more shelves, for example, by a fetching robot. After the objects are stored on the shelf, the corresponding shelf may be transported to a shelf storage location, for example, by a shelf AGV configured to move shelves by carrying or lifting them. Accordingly, the shelves may be kept in an appropriate state.

In the shipping process P30, in response to an order for items, at block S107, a shelf storing objects (e.g., storage bins or opened objects) containing the ordered items is transported to a retrieval position using, for example, a shelf AGV. At the retrieval position a desired object is retrieved from the shelf by, for example, a fetching robot. At block S108, the ordered items may be picked from within the fetched object and transferred to a shipment container or the like. At block S109, the shipment container is packed using, for example, a packing machine. At block S110, the packed shipment container is loaded into, for example, an appropriate cart or vehicle for outbound shipment.

In this way, the robot system according to one embodiment of the present technology can include or interact with a devanning robot, palletizing robot, depalletizing robot, fetching robot, piece-picking robot, packing machine, and the like. The various robots may serve as handling, transfer, sorting robots/units configured to perform operations for moving objects between different places. Also, the robot system according to one embodiment of the present technology can include a sorting system, pallet AGV, and shelf AGV as transport robots serving as transport units.

Figure 2B:
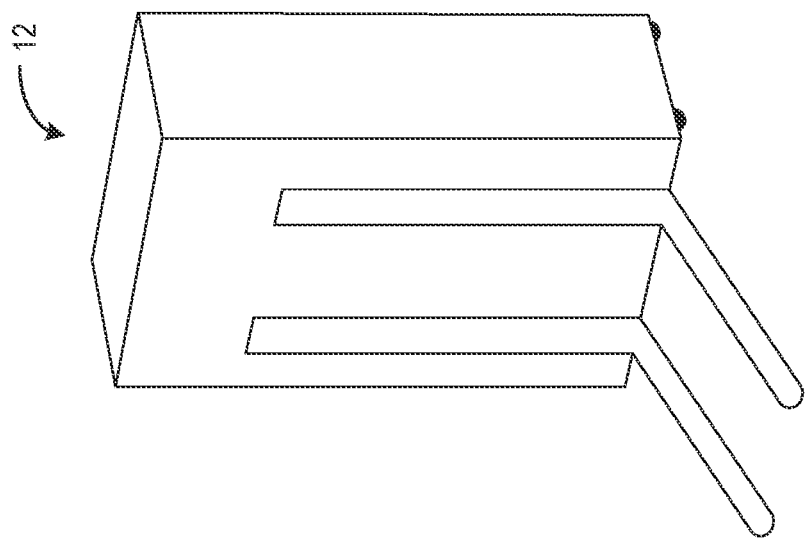
FIGS. 2A and 2B are perspective views schematically showing external appearance of example transport robots according to one or more embodiments of the present technology.
Figure 2A:
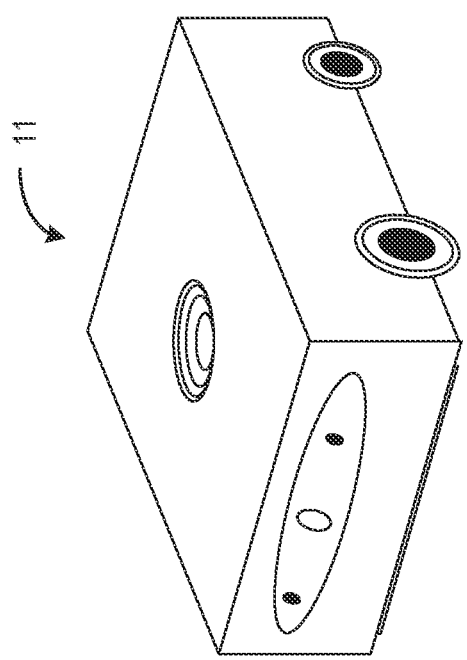

Here, FIGS. 2A and 2B are perspective views schematically showing external appearance of example transport robots 11 and 12 according to one or more embodiments of the present technology. The transport robots 11 and 12 can include a mobile/wheeled robot such as a shelf AGV configured to transport shelves between predetermined positions. For example, the transport robots 11 and 12 have such outside dimensions as to allow the transport robots 11 and 12 to move under shelves and/or between shelves. Also, the transport robots 11 and 12 can include a lifting mechanism configured to lift shelves from the ground (a transport path surface).

The transport robots 11 and 12 can be navigated using various mechanisms. For example, the transport robots 11 and 12 can travel by themselves tracing a predetermined path provided, for example, as a floor marking (e.g., painting or tape), according to instructions from a controller of a robot system. Also, the transport robots 11 and 12 can calculate current positions via a mapping/positioning mechanism (e.g., a dead reckoning system, a laser-based system, and/or a system based on a radio communications signal), and move along a specified path and route based on the current positions. Furthermore, in addition to conveyance of the shelf itself, the transport robot 12 may have a function to store objects in a shelf and/or remove objects from the shelf.

Note that a robot system (via, e.g., a controller implemented as a stand-alone device or as part of another unit) can transmit to the transport robots 11 and 12 a target position of a shelf to be transported, a storage position of the shelf, identification information about the shelf, a path, a motion plan, or a combination thereof. Based on the communicated information, the transport robots 11 and 12 can execute a task, such as by moving to the holding position of the shelf to be transported, lifting the shelf, transporting the shelf to a specified position, and/or placing the shelf at the specified position. Furthermore, the transport robots 11 and 12 can execute or complete the task by returning the shelf to be transported, to the original holding position or a different storage location.

Figure 3:
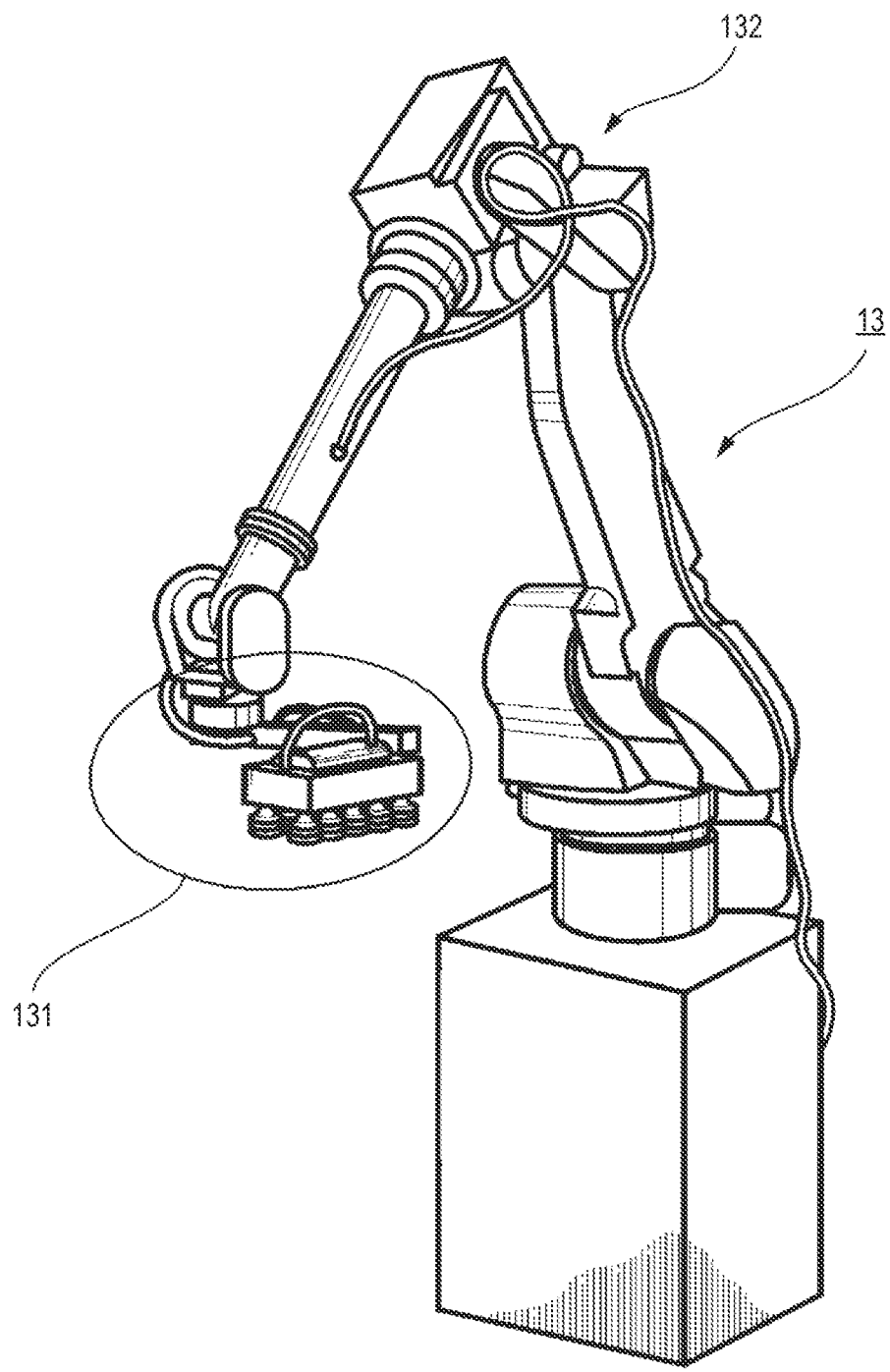
FIG. 3 is a perspective view schematically showing external appearance of an example handling robot according to one or more embodiments of the present technology.
Figure 4A:
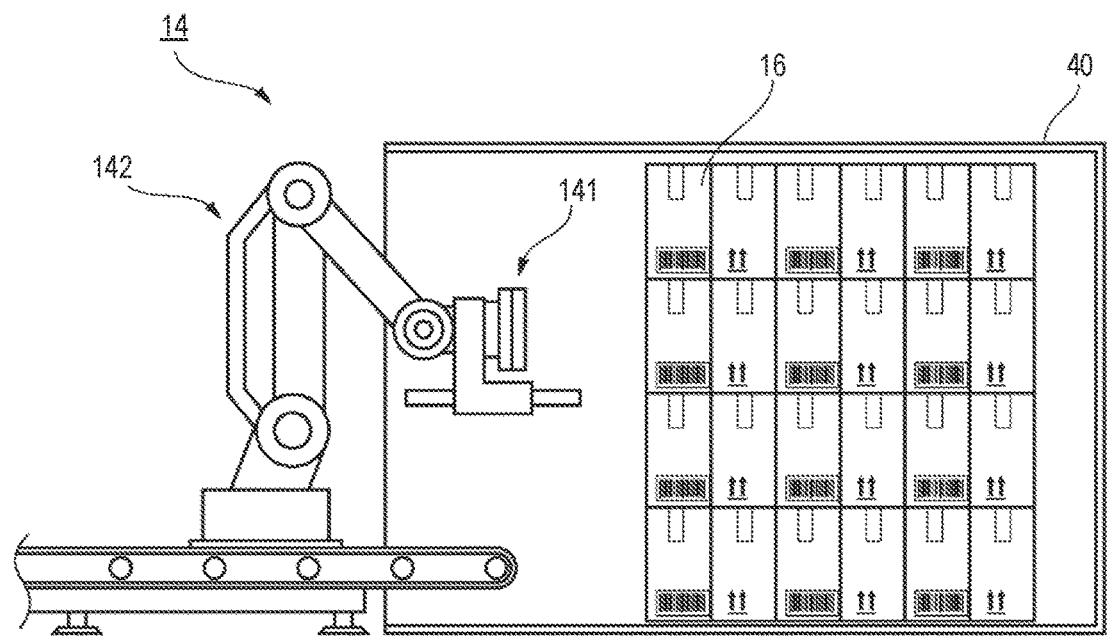
FIGS. 4A and 4B are perspective views schematically showing external appearance of an example handling robot according to one or more embodiments of the present technology.
Figure 4B:
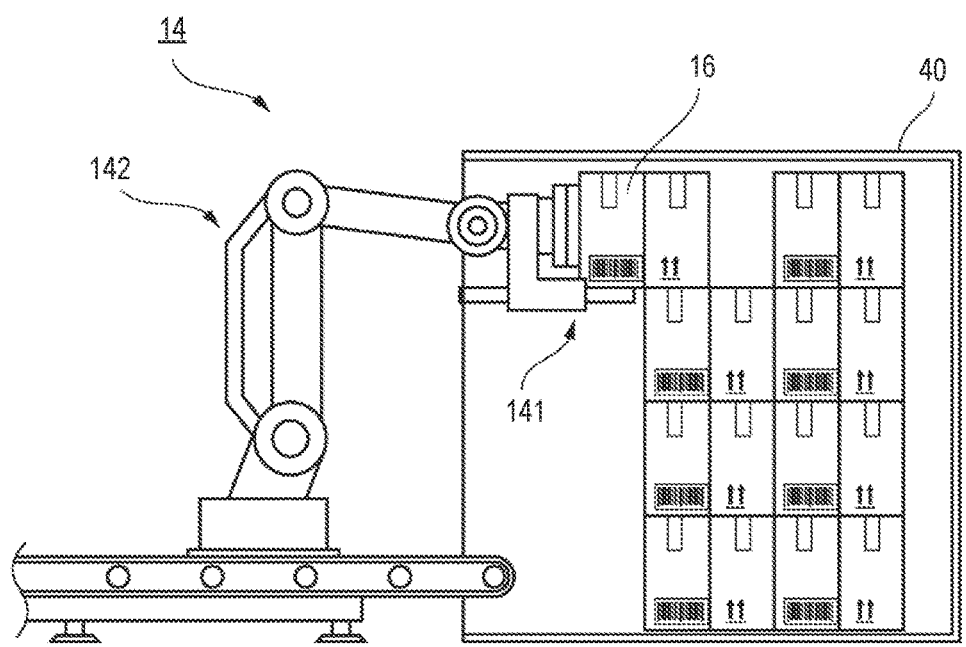

FIGS. 3, 4A, and 4B are perspective views schematically showing external appearance of example handling robots 13 and 14 according to one or more embodiments of the present technology. The handling robots 13 and 14 can include, for example, a robot configured to transfer objects 16 (see FIG. 4A) between predetermined positions. For example, the handling robots 13 and 14 have structural members (e.g., robotic arms 132 and 142) including end effectors 131 and 141 at distal ends. The end effectors 131 and 141 can include grippers capable of gripping objects by vacuum suction. This allows the handling robots 13 and 14 to grip the objects, such as from the lateral direction. Also, base of the handling robots 13 and 14 may be fixed in place (stationary) or movable. The end effector 141 of the handling robot 14 may be equipped with a plate guide or the like used to support (hold) the object 16 from below, similar to a devanning gripper. This improves load-bearing and gripping capacity in gripping the object 16 and makes it easy to deal with a relatively large object transported by a vehicle 40 or the like as shown in FIGS. 4A and 4B.

The handling robots 13 and 14 can be operated, for example, according to instructions from a controller (e.g., a stand-alone device or part of another unit). Also, the handling robots 13 and 14 can calculate current positions of handled objects and manipulate/handle the objects along specified paths and routes based on the current positions. The robot system (e.g., the controller) can transmit target positions and pickup positions of the objects and/or identification information about the objects to the handling robots 13 and 14. The robotic system (e.g., the controller) can further transmit paths, motion plans, or a combination thereof to the handling robots 13 and 14. Based on the communicated information, each of the handling robots 13 and 14 can execute a task, such as for moving the end effectors 131 and 141 to a grip position of an object, gripping and lifting the object, transferring the object to a specified position, and/or placing the object at the specified position.

Configuration Example

Figure 5:
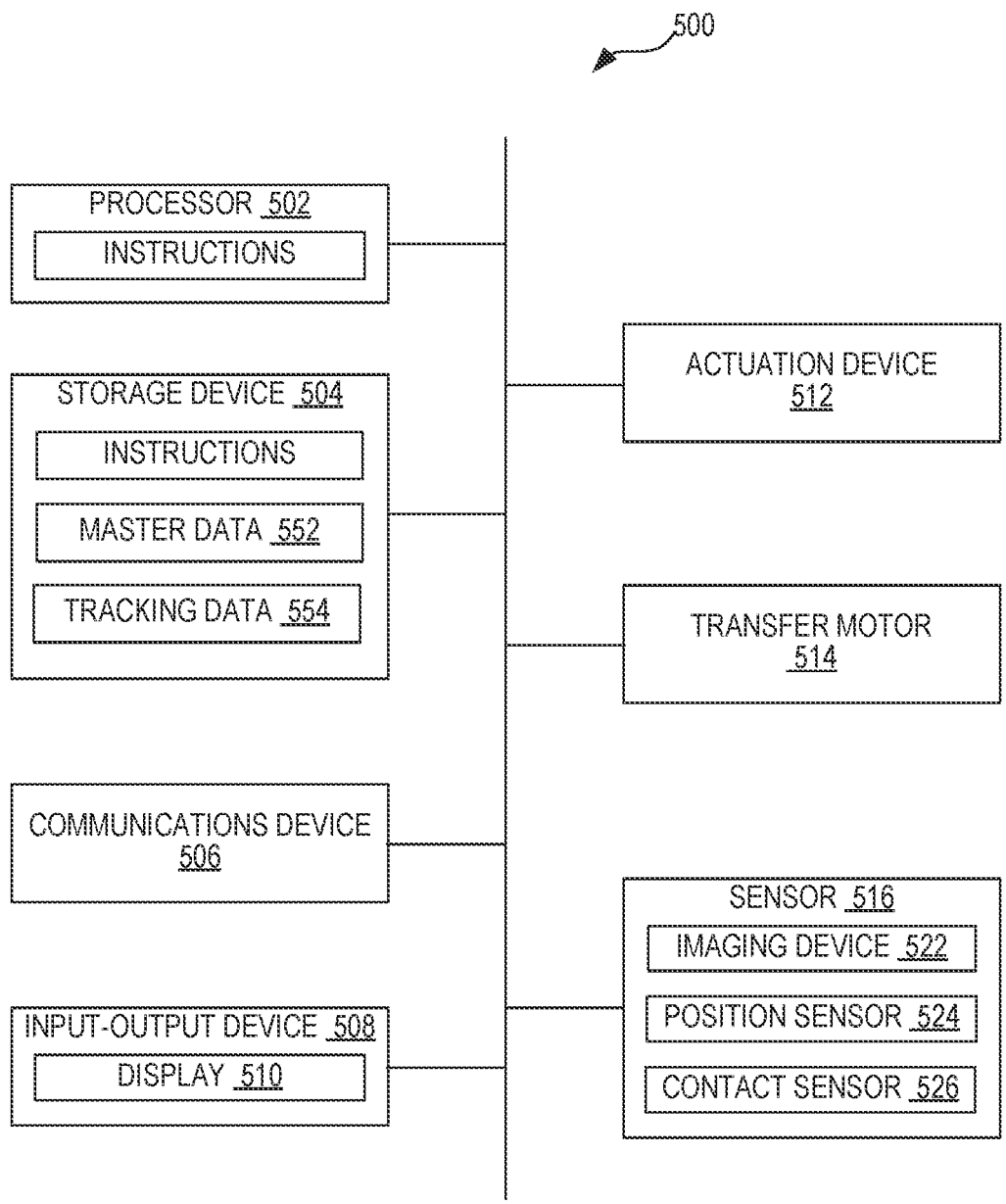
FIG. 5 is a block diagram showing an example of a hardware configuration and functional configuration of a robot system according to one embodiment of the present technology.

FIG. 5 is a block diagram showing an example of a hardware configuration and functional configuration of a robot system according to one embodiment of the present technology. For example, a robot system 500 can be equipped with electronic/electrical equipment such as a processor 502, storage device 504, communications device 506, input-output device 508, actuation device 512, transfer motor 514, sensor 516 or combination thereof. The robot system 500 can be equipped with more than one of these elements and devices.

Also, these elements and devices can be coupled together via wired connections and/or wireless connections. For example, the robot system 500 can include buses such as a system bus, a Peripheral Component Interconnect (PCI) bus or a PCI Express bus, a HyperTransport or Industry Standard Architecture (ISA) bus, Small Computer Systems Interface (SCSI) bus, Universal Serial Bus (USB), an IIC (I2C) bus, and an Institute of Electrical and Electronic Engineers (IEEE) 1394 bus (also referred to as a "Firewire" bus).

Also, to provide wired connections among devices, the robot system 500 can include, for example, a bridge, an adapter, a controller, and another signal-related device. Wireless connections may be based, for example, on a cellular communications protocol (e.g., 3G, 4G, LTE, or 5G), a wireless local area network (LAN) protocol (e.g., wireless fidelity (WIFI)), a peer-to-peer or device-to-device communications protocol (e.g., Bluetooth (registered trademark) or Near-Field Communications (NFC)), an Internet of Things (IoT) protocol (e.g., NB-IoT or LTE-M), and/or another wireless communications protocol.

The processor 502 can include a data processor (e.g., central processing unit (CPU), special-purpose computer, and/or on-board server) configured to execute commands (e.g., software instructions) stored in the storage device 504 (e.g., a computer memory). The processor 502 can execute program instructions so as to control, or interact with, other devices, thereby making the robot system 500 perform various motions, operations, and/or manipulations for tasks.

The storage device 504 can include a computer-readable non-transitory recording medium with program instructions (e.g., software) stored thereon. Examples of the storage device 504 include a volatile memory (e.g., cash and/or random access memory (RAM)), a non-volatile memory (e.g., flash memory and/or magnetic disk drive), a portable memory drive, and a cloud storage device.

In some embodiments, the storage device 504 further stores processing results, predetermined data, a predetermined threshold, a predetermined parameter, and allows access to them as appropriate. For example, the storage device 504 can store master data 552 including information data associated with objects that can be maneuvered by the robot system 500.

Regarding the objects targeted to be handled by the robot system 500, the master data 552 can include dimensions, shapes (e.g., computer-generated templates of possible states and computer-generated models used to recognize the objects in different states), colors, images, identification information (e.g., bar codes, Quick Response (QR) codes (registered trademark), and logos as well as positions where the codes and the like are expected to be provided), expected weights, or a combination thereof. Also, the master data 552 can include related information about objects and their maneuvering such as respective center-of-mass positions of the objects, expected measurement values (e.g., various measurement values of force, torque, pressure, and a contact reference value) of sensors in response to one or more motions/movements, or a combination thereof.

Also, for example, the storage device 504 can store object tracking data 554 produced when the objects are manipulated or processed by the robot system 500. The object tracking data 554 can include a log of scanned or handled objects. Also, the object tracking data 554 can include image data (e.g., photos, point clouds, and/or live videos that are provided) of objects at one or more positions (e.g., a specified pickup position or drop position, and/or, a position on a conveyor belt) and positions and/or states (orientations, etc.) of the objects at one or more positions.

The communications device 506 can include a circuit configured to communicate with an external device or remote device via a network. For example, the communications device 506 can include a receiver, transmitter, regulator/demodulator (modem), signal detector, signal encoder/decoder, connector port, and network card. The communications device 506 can be configured to receive, transmit, and/or process electric signals according to one or more communications protocols (e.g., the Internet Protocol (IP) and a wireless communications protocol). Using the communications device 506, the robot system 500 can exchange information among the units of the robot system 500 and/or with systems/apparatus external to the robot system 500 for example, for the purposes of data collection, analysis, reporting, trouble shooting, and the like.

The input-output device 508 can include a user interface device configured to exchange information with the operator and/or receive information from the operator. For example, to exchange information with the operator, the input-output device 508 can include a display 510 and/or other output device such as a speaker, tactile circuit, and tactile feedback device. Also, the input-output device 508 can include control and receiving devices such as a keyboard, mouse, touchscreen, microphone, user interface (UI) sensor (e.g., a camera used to receive motion commands), and wearable input device. Using the input-output device 508, the robot system 500 can interact with the operator when performing tasks, motions, operations, manipulations, or a combination thereof on the robot system 500.

One or more units of the robot system 500 can include a structural member (e.g., a robot arm and the like) connected by a joint for motions (e.g., rotation and/or translation) and an end effector. The end effector can be configured to perform actions, such as gripping, spinning, or welding. The robot arm may be configured to maneuver the end effector (e.g., see also FIGS. 3, 4A, and 4B). Also, at or around a joint, the robot system 500 can include an actuation device 512 (e.g., a motor, actuator, wire, artificial muscle, or electroactive polymer) configured to drive or maneuver (by e.g., displacing and/or orienting) the structural member and the transfer motor 514 configured to transfer the unit from one position to another.

The robot system 500 can include a sensor 516 to obtain information used to drive or maneuver the structural member and/or performing transfer work of various units. The sensor 516 can include various devices configured to detect or measure one or more physical properties (e.g., states, conditions, positions, and the like of one or more joints or structural members) of the robot system 500 and/or characteristics of a surrounding environment. As such a sensor 516, the robot system 500 can include an imaging sensor 522, position sensor 524, and contact sensor 526 as well as an accelerometer, gyroscope, force sensor, strain gage, and torque sensor.

Some examples of the imaging sensors 522 can include a visible camera and/or infrared camera, a two-dimensional imaging camera and/or three-dimensional imaging camera (2D vision and/or 3D vision), and a ranging device such as a lidar or radar configured to detect the surrounding environment. In applying automated inspection, robot guidance, or another robot, the imaging sensor 522 can generate display data such as digital images and/or depth measures (point clouds) that can be processed by the controller to control various units.

To handle each object, the robot system 500 can acquire and analyze images of specified regions (e.g., regions containing a grip position, a pick-up position, a drop position, and other working positions associated with the object), and thereby identify each of the positions. For example, the imaging sensor 522 can include the above-mentioned cameras and ranging devices configured to generate image data and depth measures of the specified regions. Based on acquired images and/or ranging data, the robot system 500 can determine, for example, the grip position, pick-up position, drop position, and other working positions regarding the object. Note that the robot system 500 can scan the object and keep a log of the object for transportation/storage. In this case, the imaging sensor 522 can include one or more scanners (e.g., a bar code scanner and/or QR code scanner (registered trademark)) configured to scan identification information about the object during manipulation of the object.

Also, the position sensor 524 include for example, a position encoder and potentiometer configured to detect the position of a joint/structure member (e.g., a robot arm and/or end effector) in each unit of the robot system 500. While performing task, the robot system 500 can use the position sensor 524 to keep track of the positions and/or poses (orientations, etc.) of the structural members and/or joints.

Furthermore, examples of the contact sensor 526 can include a pressure sensor, a force sensor, a strain gage, a piezoresistive/piezoelectric sensor, a capacitive sensor, an elastic resistance sensor, and other tactile sensors configured to measure properties related to direct contact between plural physical structures or surfaces. The contact sensor 526 can measure a property corresponding, for example, to a grip operation of the end effector with respect to an object. The contact sensor 526 is configured to measure a physical characteristic or condition corresponding to contact or adherence between the object and the gripper. The contact sensor 526 can output quantified measurement values (e.g., various measurement values of force, torque, pressure, and a contact reference value) corresponding to the measured physical characteristic or condition. Note that the contact reference value includes one or more readouts of force or torque in relation to force applied to the object by the end effector.

Note that the robot system 500 is described herein with regards to a warehouse and logistics system as examples, but the robot system 500 is not limited to such applications. The robot system 500 can be configured to execute various tasks in other environments or for other purposes to carry out manufacture, assembly, packing, health care and/or other types of automated operation. Also, the robot system 500 can include other non-illustrated units such as manipulators, service robots, and modular robots. Also, the robot system 500 can include, for example, various types of unloading/loading robot adapted to operate in a warehouse or distribution/transportation hub for transferring objects from a cage cart or pallet to a conveyor or another pallet. The robot system 500 may also include a sorting system, an unpacking robot used to unpack objects, a top-opening machine, a container switching robot used to transfer objects from one container to another, a packing robot used to pack objects, a packing machine, or a combination thereof.

Operation Example

Figure 6:
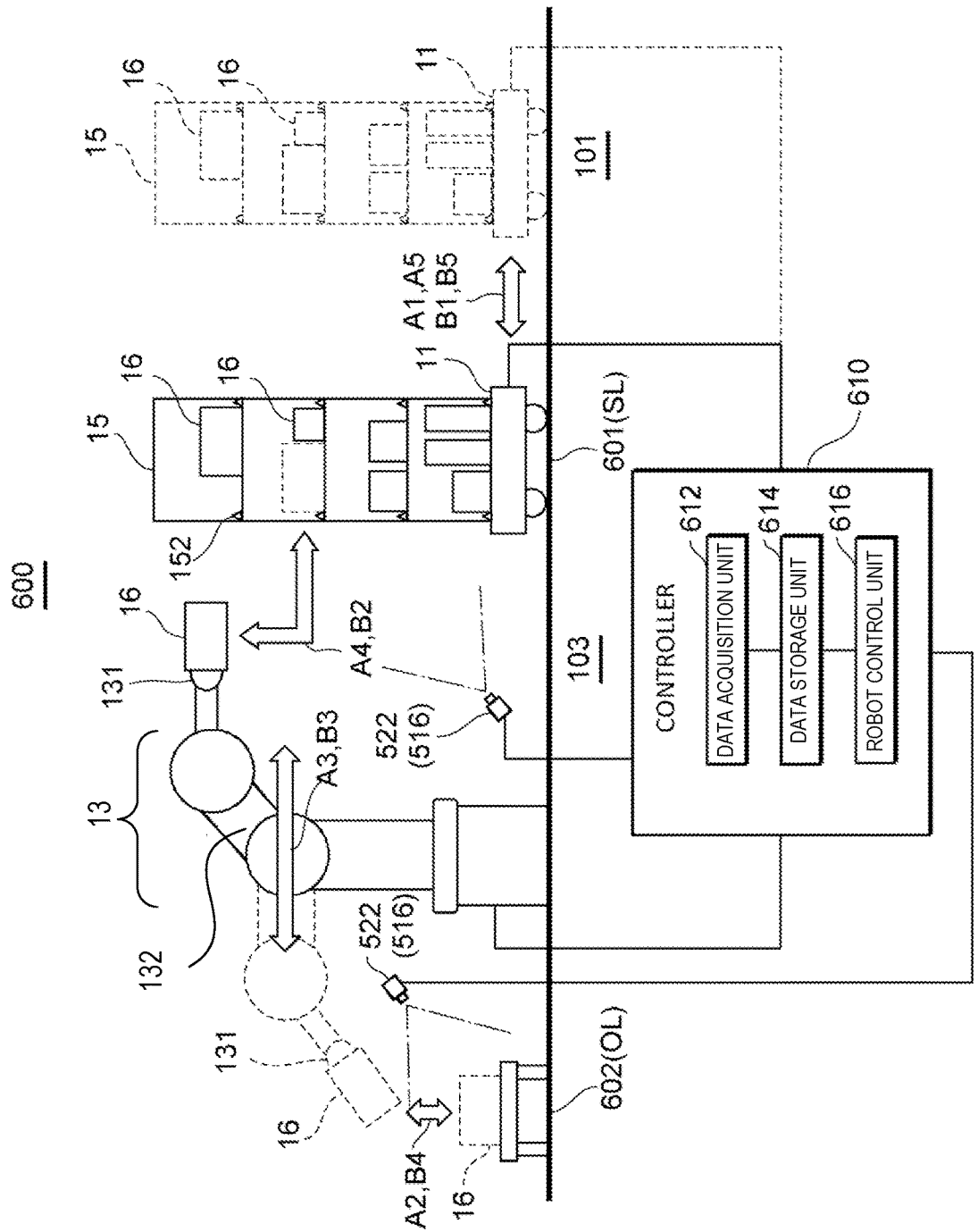
FIG. 6 is a partial functional configuration diagram showing an example of a work flow performed by a robot system according to one embodiment of the present technology as well as an example of a functional configuration of a controller provided on the robot system.

FIG. 6 is a partial functional configuration diagram showing an example of a work flow performed by a robot system according to one embodiment of the present technology as well as an example of a functional configuration of a controller provided on the robot system. In some embodiments, a robot system 600 may be implemented in a warehouse or the like. The robot system 600 can be for warehousing, stocking, storing, and shipping objects in a logistics system. The robot system 600 can include a controller 610 as an apparatus adapted to adjust and control operation of various units of the robot system 600. The robot system 600 can be configured to store objects on a shelf for the replenishment process P20 of FIG. 1 and retrieve the objects from the shelf in the shipping process P30 of FIG. 1.

As described above, the controller 610 is configured as a stand-alone device or part of another unit. The controller 610 can be configured to adjust and control motions for tasks executed by units such as the transport robots 11 and 12 and the handling robots 13 and 14. More specifically, the controller 610 may be communicably connected to the transport robot 11, the handling robot 13, and the sensor 516 (e.g., the imaging sensor 522). The controller 610 may be connected to a warehouse management system (WMS) (not shown), other host system, and/or external system, as needed.

Also, the controller 610 includes a data acquisition unit 612, a data storage unit 614, and a robot control unit 616. The controller 610 can include a processor 502, storage device 504, and communications device 506 illustrated in FIG. 5. In particular, the processor 502 can function as the data acquisition unit 612 and robot control unit 616 while the storage device 504 can function as the data storage unit 614. The robot system 600 can be configured to execute a first task of storing objects 16 on a shelf 15 and/or a second task of retrieving the objects 16 from the shelf 15.

First Task: Storing Objects 16 in Shelf 15

For the first task, sub-tasks A1 to A5 shown below are executed in sequence according to appropriate timing.

A1: The shelf 15, initially kept in a storage area 101, is transported (via the transport robot 11) from its storage location to an access position 601 (stop location (SL)) in a grouping area 103.

A2: Each object 16 may be placed, for example, at a transfer (output) location 602 (output location (OL)), such as on a conveyor in the grouping area 103. To further manipulate the object 16, the object 16 can be gripped by the handling robot 13. The object 16 may be gripped via suction and/or along a lateral direction. The object 16 may be held or supported from below in the case of the handling robot 14; the same applies to the following.

A3: The gripped object 16 is moved from the transfer location 602 to the access position 601.

A4: The object 16 is stored (replenished or stocked) in a specified vacant position on the shelf 15. The shelf may be held at rest by the transport robot 11 for the storage sub-task.

A5: After replenishing the object 16, the shelf 15 is returned from the access position 601 to the storage location in the storage area 101 by the transport robot 11.

Figure 7:
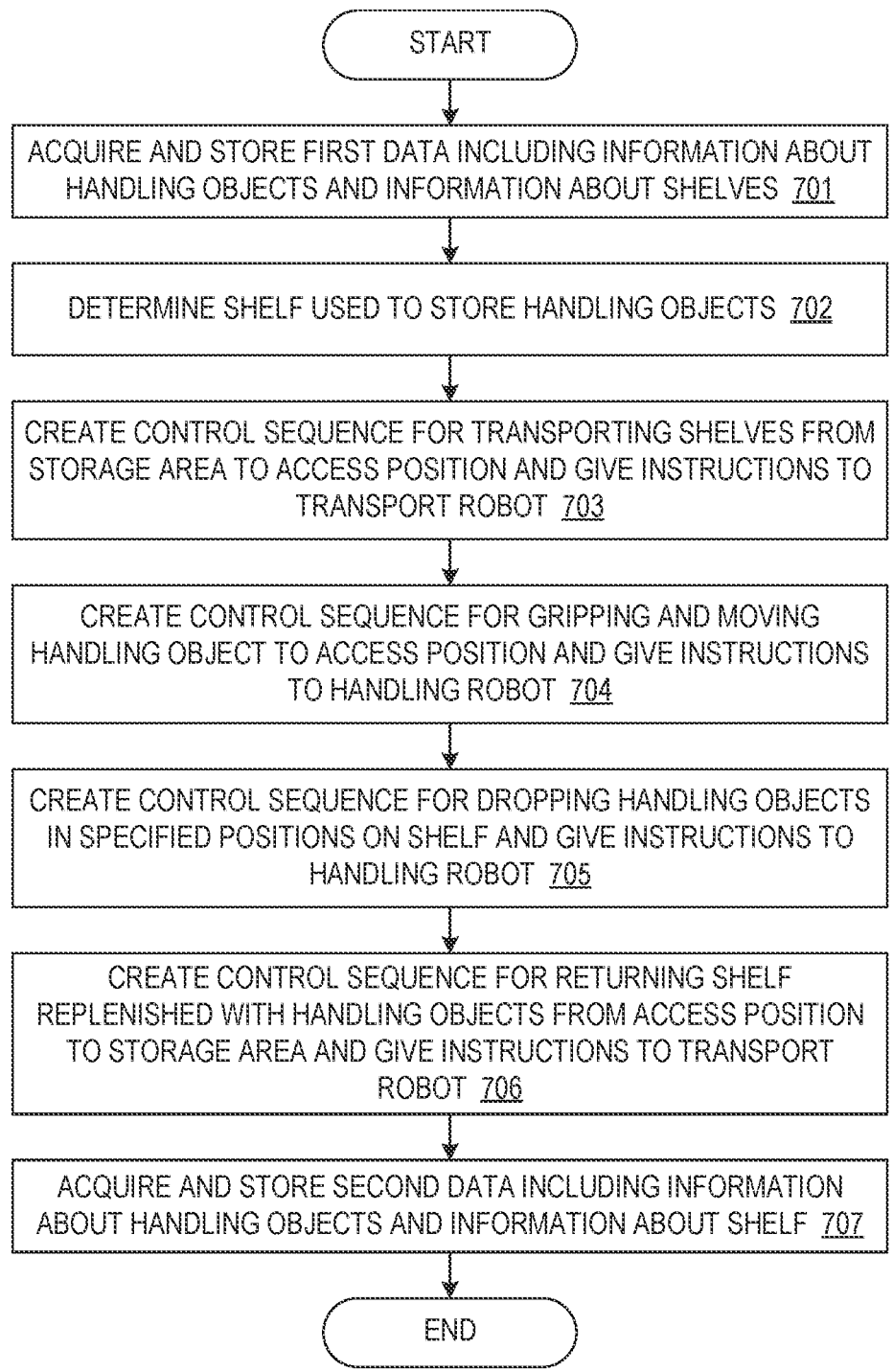
FIG. 7 is a flowchart showing an example of procedures for executing a first task by operating a robot system according to an embodiment of the present technology.

FIG. 7 is a flowchart showing an example of procedures for executing the first task by operating a robot system according to an embodiment of the present technology. At block 701, the data acquisition unit 612 acquires, for example, first data including information about objects 16 before executing the sub-task A1. The data acquisition unit 612 may further acquire information about each shelf 15. The data storage unit 614 can store the first data by associating the first data with the objects 16 and/or the shelves 15.

For example, the data acquisition unit 612 can image the object 16 temporarily placed at the transfer location 602 in the grouping area 103. The data acquisition unit 612 may use a 3D-vision or other imaging sensor 522 and acquire information about the object 16 such as identification information, positional information, and/or shape information. The data acquisition unit 612 may acquire information on the weight and center of mass based on processing the acquired image data as well as on the master data 552. Alternatively, information about the object 16 and shelf 15 can be estimated or pinpointed from tracked or processed information regarding the objects 16 and/or the shelves 15 in the master data 552. Note that, for identifying/tracking an object 16, for example, methods described in Japanese Patent Applications Nos. 2019-118678 and 2019-080213, U.S. patent application Ser. No. 16/258,120, now U.S. Pat. No. 10,456,915, and other applications can be used. Alternatively, the data acquisition unit 612 can acquire information about the object 16 from a host system such as the WMS. In that case, information about the object 16 can be acquired in advance before the object 16 is placed at the transfer location 602.

At block 702, based on information about the objects 16 and/or the shelves 15 kept in the storage area 101, the robot control unit 616 determines the shelf 15 targeted to store the objects 16. In this case, the robotic unit can select the shelf 15 suitable to receive and store the objects 16 according to the shape of the objects 16, available space on the shelf 15, an SKU (Stock Keeping Unit) of the objects 16 going to be stored, an SKU of the objects 16 already on the shelf 15, and the like. The robot control unit 616 selects the shelf 15 based on increasing storage efficiency for the entire warehouse, such as by concentrating/grouping the objects 16 according to the SKU. Furthermore, the robot control unit 616 can select the shelf 15 according to a transport path and the like to the grouping area 103.

At block 703, the robot control unit 616 specifies the transport robot 11 used to transport the selected shelves 15 from the storage area 101 to the access position 601 in the grouping area 103. The robot control unit 616 can create or acquire a control sequence (e.g., a transport path of the shelf 15 and/or the transport robot 11), such as using machine learning or the like. Based on the control sequence, the robot control unit 616 instructs the specified transport robot 11 to execute the sub-task A1 of transporting the shelf 15 to the access position 601.

In block 704, based on information about the objects 16, the robot control unit 616 creates or acquires a control sequence, such as using machine learning or the like. The robot control unit 616 can create or acquire the control sequence either simultaneously with the sub-task A1 or before or after the sub-task A1. The control sequence may involve gripping (via, e.g., vacuum) from the lateral direction, and subsequently moving the object 16 temporarily placed at the transfer location 602. The control sequence can include moving or transferring the object 16 from the transfer location 602 to the access position 601 using the handling robot 13. Based on the control sequence, the robot control unit 616 instructs the handling robot 13 to execute the sub-tasks A2 and A3 of gripping and moving the object 16 to the access position 601.

The timing to execute the sub-tasks A2 and A3 is not specifically limited. For example, the robot control unit 616 may instruct the handling robot 13 to perform at least part of the handling in the control sequence before the shelf 15 reaches the access position 601. In that case, before the shelf 15 reaches the access position 601, the handling robot 13 can complete the operation of gripping and moving the objects 16 to the access position 601. When the shelf 15 arrives, the handling robot 13 can execute the sub-task A4 of storing the objects 16 on the shelf 15.

At block 705, the controller 610 images the objects 16 and shelf 15 at the access position 601 using a 3D-vision or other imaging sensor 522. The controller 610 can process the resulting image data, and check the states and conditions of the objects 16 and shelf 15. Furthermore, at block 705, based on information about the objects 16 and the shelf 15 (e.g., availability of the shelf 15, in particular), the robot control unit 616 specifies positions on shelf boards on the shelf 15 targeted or selected to store the objects 16. The robot control unit 616 can create or acquire a control sequence, for example, using machine learning or the like. The control sequence can include travel paths of the objects 16 to these positions. Based on the control sequence, the robot control unit 616 instructs the handling robot 13 to execute the sub-task A4 of dropping or placing the objects 16 in specified positions on the shelf 15, which may be held at rest by the transport robot and/or placed at the access position 601.

In so doing, the robot control unit 616 can designate, for example, any position on the shelf 15 as reference coordinates for the handling robot 13 to access the shelf 15. The resting position or the current location of the shelf 15 can be calculated based on the access position 601 at which the transport robot 11 holding the shelf 15 stops; the position of the shelf 15 on the transport robot 11 may deviate from a standard position. Thus, the controller 610 calculates positions of the transport robot 11 and shelf 15 from image data of the shelf 15 at the access position 601. The data acquisition unit 612 can acquire relative positional information about the transport robot 11 and shelf 15. The robot control unit 616 may correct positional information about the shelf 15 at the access position 601 based on the relative positional information about the two. The robot control unit 616 may create or acquire a control sequence for the sub-task A4 based on the corrected positional information about the shelf 15.

Also, the shelf 15 may include multiple tiers of shelf boards that may each receive, store, and provide access to (e.g., along a lateral direction) the objects 16. Safety catchers 152 may be provided on end portions of each shelf board of the shelf 15. In some embodiments, the safety catchers 152 may protrude upward from the end portions. Consequently, the robot control unit 616 can create or acquire a control sequence such that the objects 16 is gripped by the handling robot 13 along a lateral/horizontal direction and is moved over the safety catcher 152 without interfering with the safety catchers 152.

When storage (replenishment) of the objects 16 on the shelf 15 is completed in this way, such as at block 706, the robot control unit 616 creates or acquires a control sequence, which may include a transport path along which the shelf 15 replenished with the objects 16 may be returned. The transport path can be for returning the shelf 15 from the access position 601 to the storage location in the storage area 101 by the transport robot 11. Based on the control sequence, the robot control unit 616 instructs the transport robot 11 to execute the sub-task A5 of transporting and returning the shelf 15 to the storage area 101.

When the above-mentioned first task of storing objects 16 on the shelf 15 is completed, such as at block 707, the data acquisition unit 612 acquires second data including information about the shelf 15 the received the objects 16. The second data may further include information about storage locations of the objects 16 on the shelf 15. The data storage unit 614 can store the second data in association with the objects 16 and shelf 15.

For subsequent storage or restocking tasks involving the objects 16 and/or the shelf 15, the robot control unit 616 can create or acquire a control sequence configured to keep the objects 16 in a concentrated manner based on the second data. In other words, the objects 16 can be placed on the shelf 15 as a group with minimal space between the objects 16. Also, based on properties of the objects 16, the robot control unit 616 can create or acquire the control sequence that groups the objects 16 according to the SKU. Further, the control sequence can be for grouping/placing the objects 16 corresponding to equal or similar shapes and/or sizes in a concentrated manner. The second data can be updated after transfer of each object 16 to or from the shelf 15 as described below.

Furthermore, based on the second data, the data storage unit 614 can store positional information (layout information) about one or more objects 16 on the shelf 15. The data storage unit 614 can further organize the positional information according to each object or groupings of objects, according to each shelf board (layer) of the shelf 15 (e.g., as two-dimensional information for each shelf board), and/or for the overall shelf (e.g., as three-dimensional information across multiple shelf boards).

Also, each object 16 may have an identification code or identification tag accessible from a side surface thereof. The object 16 may be placed on the shelf 15 such that the identification information on the side surface may be exposed in such a way as to be visible from outside the shelf 15. By checking the identification information about the object 16 using the imaging sensor 522 or the like, even when the object 16 is on the shelf 15, the object 16 can be identified and located easily. When the positional information about multiple objects 16 on the shelf 15 is stored as two-dimensional information or three-dimensional information, locating any object on the shelf 15 can lead to locating the targeted objects 16 on the shelf 15. The targeted objects 16 can be located based on a relative location/relationship to the initially located object. Note that the imaging sensor 522 can be configured to image the shelf 15 either when the transport robot 11 holding the shelf 15 is at rest or when the transport robot 11 holding the shelf 15 is moving, i.e., either when the shelf 15 is at rest or moving.

Also, the robot control unit 616 may be configured to flag that the storage of an object 16 on the shelf 15 is or will be complete before placement (e.g., sub-task A4) of the object 16 on the shelf 15 is actually finished. For example, the robot control unit 616 set the flag by checking an operating state of an end effector of the handling robot 13 or by tracking movement of the object 16, such as by using the imaging sensor 522. The flag can be set to indicate that the storage of the object 16 is complete when the entire object 16 or most part of the object 16 is moved to the shelf board of the shelf 15 or when part of the object 16 touches the shelf board.

The robot system 600 can execute the first task (storage of objects 16 on the shelf 15) and the second task (retrieval of objects 16 from the shelf 15) based on implementing unit tasks B1 to B5 in appropriate order/sequence with appropriate timing.

Second Task: Retrieving Objects 16 from Shelf 15

The second task can include a sequence of unit tasks B1 to B5 described below.

B1: A shipping order that specifies stored objects 16 may be received. The shelf 15 kept in the storage area 101 may store the ordered objects 16. Such shelf 15 may be transported (e.g., via the transport robot 11) from the storage location to the access position 601 (stop location SL) in the grouping area 103.

B2: The shelf 15 may be held by the transport robot 11 and transported to the access position 601. Each object 16 on the shelf 15 may be gripped by the handling robot 13. For example, the handling robot 13 may approach the object 16 along lateral direction and grip the object 16 via suction.

B3: The gripped object 16 is moved from the access position 601 to the transfer location 602.

B4: The object 16 is dropped and placed (e.g., temporarily) at the transfer location 602.

B5: The shelf 15 from which the objects 16 have been retrieved is returned from the access position 601 to the storage location in the storage area 101 by the transport robot 11.

Figure 8:
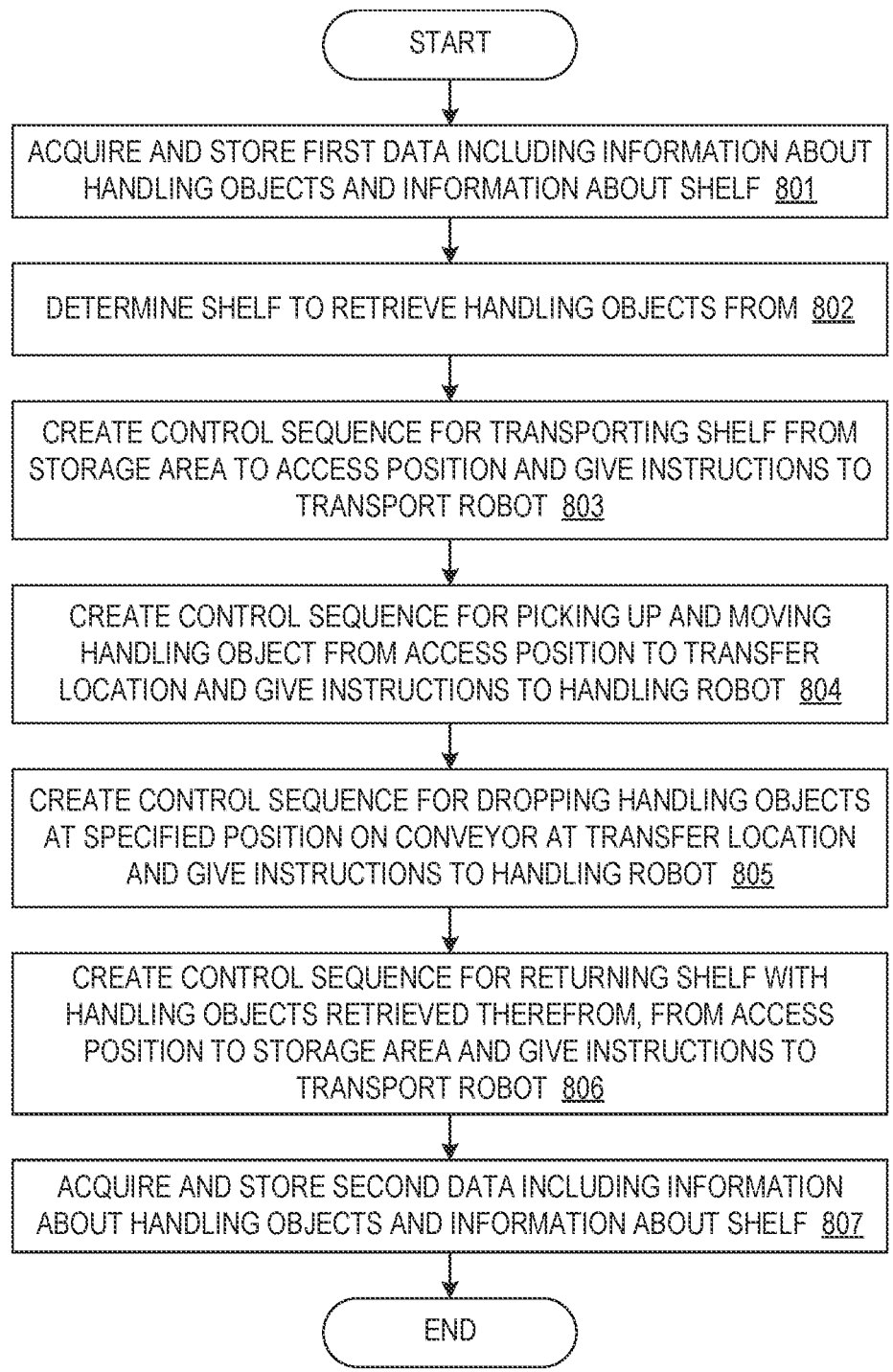
FIG. 8 is a flowchart showing an example of procedures for executing a second task by operating a robot system according to an embodiment of the present technology.

FIG. 8 is a flowchart showing an example of procedures for executing the second task by operating a robot system according to an embodiment of the present technology. First, at block 801, the data acquisition unit 612 acquires, for example, first data including information about objects 16 before executing the sub-task B1. The data acquisition unit 612 may further acquire information about each shelf 15. The data storage unit 614 can store the first data by associating the first data with the objects 16 and/or shelves 15.

For example, when a shipment order for the objects 16 is received the data acquisition unit 612 can acquire information about the ordered objects 16. The data acquisition unit 612 can acquire the information based on the second data stored in the data storage unit 614 and/or the master data 552. Some examples of the acquired information may include identification information, positional information, shape information, and information on the weight and center of mass of the ordered objects 16. Other examples of the acquired information may include identification information and storage location of the shelf 15 on which the ordered objects 16 are stored. At block 802, based on the information about the objects 16 and the shelves 15, the robot control unit 616 can select a shelf 15 to retrieve the ordered objects 16. The robot control unit 616 can determine one or more optimal shelves 15 having the ordered objects 16 thereon based on corresponding transport paths and the like to the grouping area 103.

At block 803, the robot control unit 616 specifies the transport robot 11 for transporting the one or more determined shelves 15 from the storage area 101 to the access position 601 in the grouping area 103. The robot control unit 616 can create or acquire a control sequence (via, e.g., machine learning or the like) that may include a transport path of the shelf 15 transported by the transport robot 11. Based on the control sequence, the robot control unit 616 instructs the specified transport robot 11 to execute the sub-task B1 of transporting the shelf 15 to the access position 601.

When an end effector of the handling robot 13 is not at the access position 601, the robot control unit 616 instructs the handling robot 13 to move the end effector of the handling robot 13 to the access position 601. The robot control unit 616 may move the end effector either simultaneously with the sub-task B1 or before or after the sub-task B1. In this case, by completing the movement of the handling robot 13 before the shelf 15 reaches the access position 601, the handling robot 13 can execute the sub-task B2 of retrieving the objects 16 from the shelf 15 immediately upon arrival of the shelf 15.

When the transport robot 11 arrives at the access position 601, such as at block 804, the controller 610 images the objects 16 and shelf 15 at the access position 601 using a 3D-vision or other imaging sensor 522. The controller 610 may process the resulting image data and check the states and condition of the objects 16 and shelf 15. Furthermore, at block 804, based on information about the objects 16 and the shelf 15 (e.g., storage situation in the shelf 15, in particular), the robot control unit 616 specifies the position of an object 16 on the shelf 15. The robot control unit 616 can create or acquire a control sequence (e.g., by machine learning or the like) which may include a travel path of the end effector to the position and/or commands or settings for picking up and moving the object 16 from the access position 601 to the transfer location 602. Based on the control sequence, the robot control unit 616 instructs the handling robot 13 to execute the sub-tasks B2 and B3 of gripping the object 16 on the shelf 15 that is held by the transport robot 11. The object may be gripped when the transport robot 11 is stopped at the access position 601 and/or moving to the transfer location 602.

In so doing, as with the first task, the controller 610 calculates positions of the transport robot 11 and shelf 15 from image data of the shelf 15 at the access position 601. The data acquisition unit 612 can acquire relative positional information about the transport robot 11 and shelf 15. The robot control unit 616 corrects positional information about the shelf 15 at the access position 601 based on the relative positional information about the two. Accordingly, the robot control unit 616 can create or acquire a control sequence for the sub-task B2, such as via machine learning or the like. The robot control unit 616 can create or acquire the control sequence based on the corrected positional information about the shelf 15. Also, the robot control unit 616 can create or acquire a control sequence such that the objects 16 will move over the safety catcher 152 without interfering with the safety catchers 152.

At block 805, the controller 610 images the objects 16 at the transfer location 602 as well as images the transfer location 602 (e.g., a conveyor surface and final position) using a 3D-vision or other imaging sensor 522. The controller 610 can process the resulting image data and check the depicted states and situations of the objects 16 and the transfer location 602. Furthermore, at block 805, the robot control unit 616 can create or acquire a control sequence, which may include a specified position of the objects 16 that make up the travel paths to the specified position. Based on the control sequence, the robot control unit 616 instructs the handling robot 13 to execute the sub-task B4 of dropping or placing the objects 16 at the specified position in the transfer location 602. Note that in directly placing the objects 16 in a shipment container provided at the transfer location 602, the availability of space in the shipment container may be checked using the imaging sensor 522. The resulting image may be processed to increase the storage efficiency.

After the objects 16 are retrieved, such as at block 806, the robot control unit 616 creates or acquires a control sequence. The control sequence may include a transport path for returning the shelf 15 from which the objects 16 have been retrieved. The transport path may be for returning the shelf 15 from the access position 601 to the storage location in the storage area 101 using the transport robot 11. Based on the control sequence, the robot control unit 616 instructs the transport robot 11 to execute the sub-task B5 of transporting the shelf 15 to the storage area 101.

When the above-mentioned second task of retrieving handling objects 16 from the shelf 15 is complete, such as at block 807, the data acquisition unit 612 acquires the second data regarding the shelf 15 from which the objects 16 have been retrieved. The second data may further include information about the storage locations of the other objects 16 on the shelf 15. The data storage unit 614 may store the second data by associating the second data with the objects 16 and shelf 15. In this way, the second data on the storage situation of objects 16 on the shelf 15 is updated after each manipulation/removal of the object 16. Also, as with the first task, the data storage unit 614 can use the second data to store the positional information about multiple objects 16 on the shelf 15. The positional information may represent the multiple objects as two-dimensional information (e.g., for a shelf board) or three-dimensional information (e.g., for the overall shelf).

Also, as with the first task, when the objects 16 stored on the shelf 15 have identification information on a side surface, the identification information about the objects 16 can be checked using the imaging sensor 522. Furthermore, the imaging sensor 522 can be configured to image the shelf 15 when the transport robot 11 holding the shelf 15 is at rest or when the transport robot 11 holding the shelf 15 is moving.

Also, the robot control unit 616 may be configured to indicate that the retrieval of an object 16 from the shelf 15 is or will be complete before the retrieval (sub-task B2) of the object 16 from the shelf 15 is actually finished. For example, by checking an operating state of an end effector of the handling robot 13 or by tracking movement of the object 16 using the imaging sensor 522, completion status of the object retrieval may be tracked or determined. The robot control unit 616 can indicate the completion status when the entire object 16 or most part of the object 16 is moved out of the shelf 15 or when the entire object 16 or part of the object 16 leaves the shelf board.

The controller 610 and control method for the robot system 500 or 600 configured as described above makes it possible to determine information about the objects 16 and the shelf 15 before storing the objects 16 on the shelf 15 or before retrieving the objects 16 from the shelf 15. The robot system 500 or 600 can execute tasks (first and second tasks) via a control sequence created or acquired based on the first and/or second data including the above information. This in turn makes it possible to efficiently and smoothly perform the operation of storing the objects 16 on the shelf 15 and the operation of retrieving the handling objects 16 from the shelf 15. In so doing, sophisticated cooperation among units of the robot system 500 or 600 (e.g., between the transport robot 11 and handling robot 13) can be implemented, making it possible to expand the functionality of the robot systems 500 and 600.

Another Application Example 1

Figure 9A:
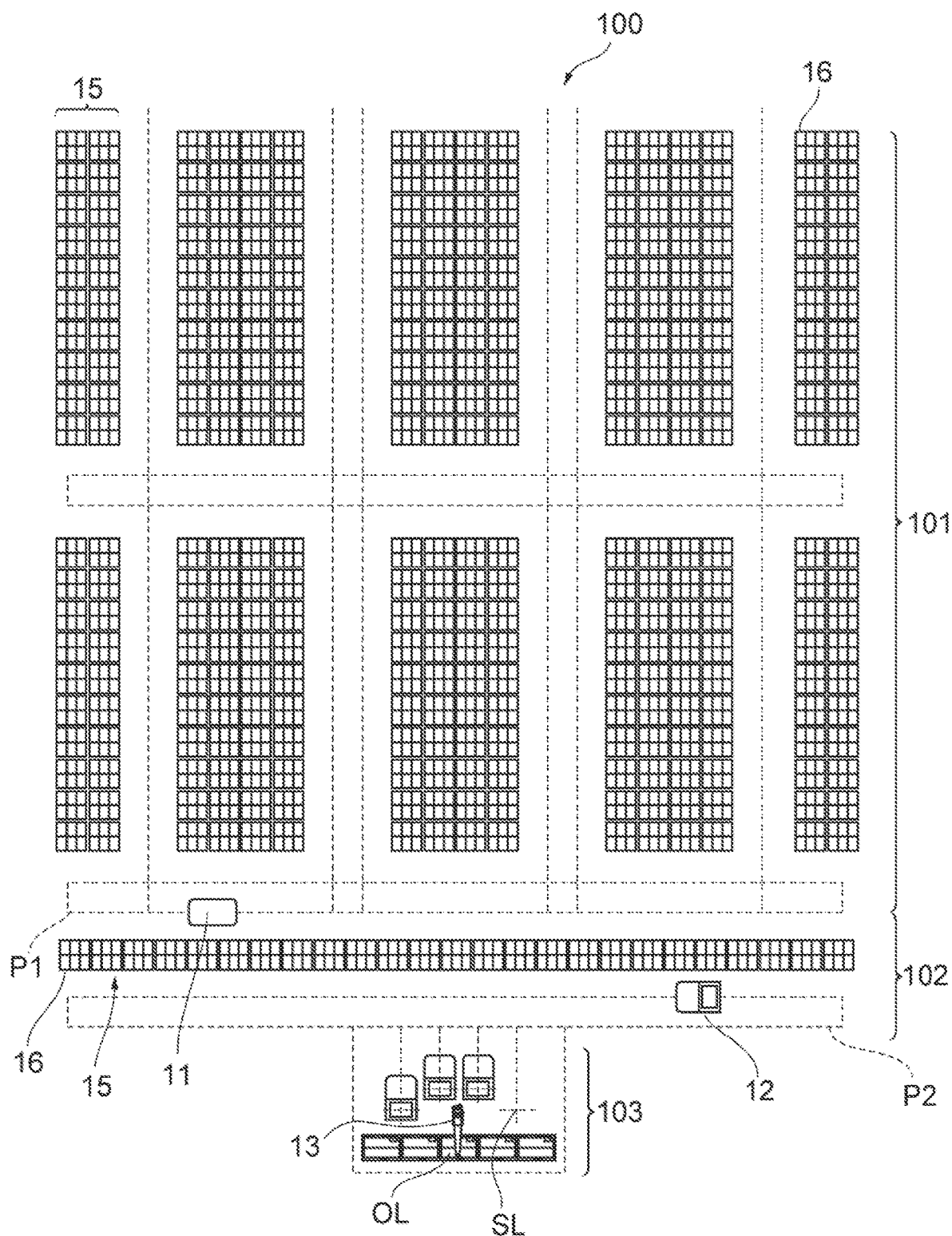
FIG. 9A is a schematic plan view showing an example environment in which a robot system according to one embodiment of the present technology can operate.

FIG. 9A is a schematic plan view showing an example environment in which a robot system according to one embodiment of the present technology can operate. As with the robot system 600, a robot system 100 can be installed, for example, in a warehouse or the like. The robot system 100 may serve as a foothold for warehousing, replenishment, storage, and shipping in a logistics system. Also, the robot system 100 can be configured to perform or execute one or more tasks and/or an appropriate combination of plural tasks. The tasks can be performed or executed suitably by one or more units (e.g., various robots, various devices, a controller provided integrally therewith or separately therefrom) of the robot system 100. Also, the robot system 100 can be used to transfer ordered items from a stored object to a shipment container in the shipping process P30 shown in FIG. 1.

As shown in FIG. 9A, the robot system 100 can include one or more transport robots 11 and 12 (e.g., one or more AGVs described above) serving as a transport unit/transport units, one or more handling robots 13 (e.g., piece-picking robots) serving as transfer/sorting units configured to move objects between different places. The robot system 100 can include a controller (not shown in FIG. 9A).

To achieve predetermined goals, the tasks can be combined. The combined tasks can include individual tasks targeted for execution by corresponding units in appropriate order. The combined tasks may be configured such that each unit will execute various different tasks selected as appropriate. Each unit of the robot system 100 can execute one or more tasks to access various different items scattered in the storage area 101, such as stored on the shelf 15 or in a container 16. The tasks can be for accessing various different items according to properties of the items specified by an incoming order or a packing order.

The transport robot 11 can execute the task of transferring, for example, the shelves 15 having the containers 16 stacked or stored thereon. The shelves 15 can be transferred between the storage area 101 and a transportation area 102. The transport robot 12 can also retrieve (pick up) containers 16 from the transported shelves 15. Also, the transport robot 12 can execute the task of transferring the containers 16 between the transportation area 102 and the grouping area 103 (an area used to group items, such as the stop location SL of the containers 16 in FIG. 9A). The handling robot 13 can execute the task of picking up ordered items from within the containers 16 that has been placed in the grouping area 103. The containers 16 can be moved to the transfer location OL (e.g., containers or boxes packing the ordered items, or a conveyor or temporary storage area on which the containers or boxes are placed) and/or other shipment containers or the like.

In executing a task, for example, when a shipment order is issued, when stored objects are rearranged, or when item replenishment is carried out, the robot system 100 can identify different areas in which individual units and/or unit groups operate. In some embodiments, the robot system 100 can identify the storage area 101 in which the transport robot 11 operates, the transportation area 102 in which the transport robot 12 operates, and the grouping area 103 in which the transport robot 12 and/or handling robot 13 operate. Note that the areas in which the transport robots 11 and 12 and handling robot 13 operate are not limited to the areas described above, and, for example, the transport robot 11 may further operate in the transportation area 102 and the transport robot 12 may further operate in the storage area 101 according to an appropriate control sequence.

Also, the areas in which the units operate may be adjacent to each other or partially overlap each other. For example, the storage area 101 may be adjacent to the transportation area 102 while the transportation area 102 may partially overlap the grouping area 103. The transport robots 11 and 12 can operate in different areas by accessing the shelf 15 in the transportation area 102, for example, as shown in FIG. 9A. Consequently, the robot system 100 can reduce the possibility of potential collisions or obstructions involving different types of unit. Note that the handling robot 13 can be fixed in place, making it easy for the transport robot 12 to enter the grouping area 103 without colliding with other units or causing congestion during movement.

Also, the robot system 100 can use appropriate paths to navigate transport units such as the transport robots 11 and 12. For example, the robot system 100 can use a first path P1 to maneuver one or more transport robots 11, and/or a second path P2 to maneuver one or more transport robots 12. Note that the first path P1 and second path P2 may be separated from each other by a distance or space so as not to overlap each other, for example, as shown in FIG. 9A, but this is not restrictive.

Also, floor markings (e.g., painting or tape) may be provided on the first path P1 and second path P2 in order for transport units to trace the floor markings for locomotion. This allows the robot system 100 to identify shapes/positions of the floor markings and use the identified information when instructing the transport units to perform path calculations and/or sequence positions (e.g., pick-up positions and/or drop positions of objects to be transported). Furthermore, the first path P1 and second path P2 can include a series of links (e.g., paths among the shelves 15) and nodes (e.g., crossing positions of paths or specified positions used in changing a travel direction).

Also, the robot system 100 can calculate efficient paths that allow transport units to move between pick-up positions and/or drop positions without interfering with other units. These transport units can calculate current positions on the paths using, for example, a position/navigation system and move along specified paths and routes based on the current positions.

Note that as described above, the robot system 100 can set tasks as a series of tasks executed by multiple units, and control each of the plural units based on characteristics of individual tasks for optimizing execution of an integrated task. For example, the robot system 100 can make adjustments such as defining a range of operations that require plural units or defining a range of operations that involves plural specified areas.

For example, to respond to a shipment order and fulfill the order, tasks can be executed. The tasks may involve: pinpointing the storage location of ordered items in the storage area 101, such as a shelf 15 storing ordered items or a shelf 15 in which a container 16 storing the ordered items is stacked; transferring the shelf 15 to the transportation area 102; transferring the container 16 from the shelf 15 to the grouping area 103; transferring the ordered items from the container 16 to a target position such as a shipment container and/or conveyor; returning the container 16 to the shelf 15; and returning the shelf 15 to the storage area 101.

Also, to deal with warehousing of items or replenishment with items, tasks or a task made up of an appropriate combination thereof can be executed, where the tasks involve: determining a container 16 capable of storing the items and a shelf 15 capable of storing the container 16 as a storage location of the items based, for example, on demand forecasting to determine an available storage location; storing warehoused items or replenishment items in the container 16; loading the container 16 storing the warehoused items or replenishment items into the shelf 15; and transferring the shelf 15 to an appropriate predetermined storage location.

Also, to maneuver various units, the robot system 100 can generate, for example, commands, control settings, motion plans, positions, identification information, paths, current positions of the units, states, progress information, or a combination thereof needed to operate actuators in the respective units. The generated information can be communicated among the individual units, and tasks can be executed by sharing the generated information among the controller and units.

Figure 9B:
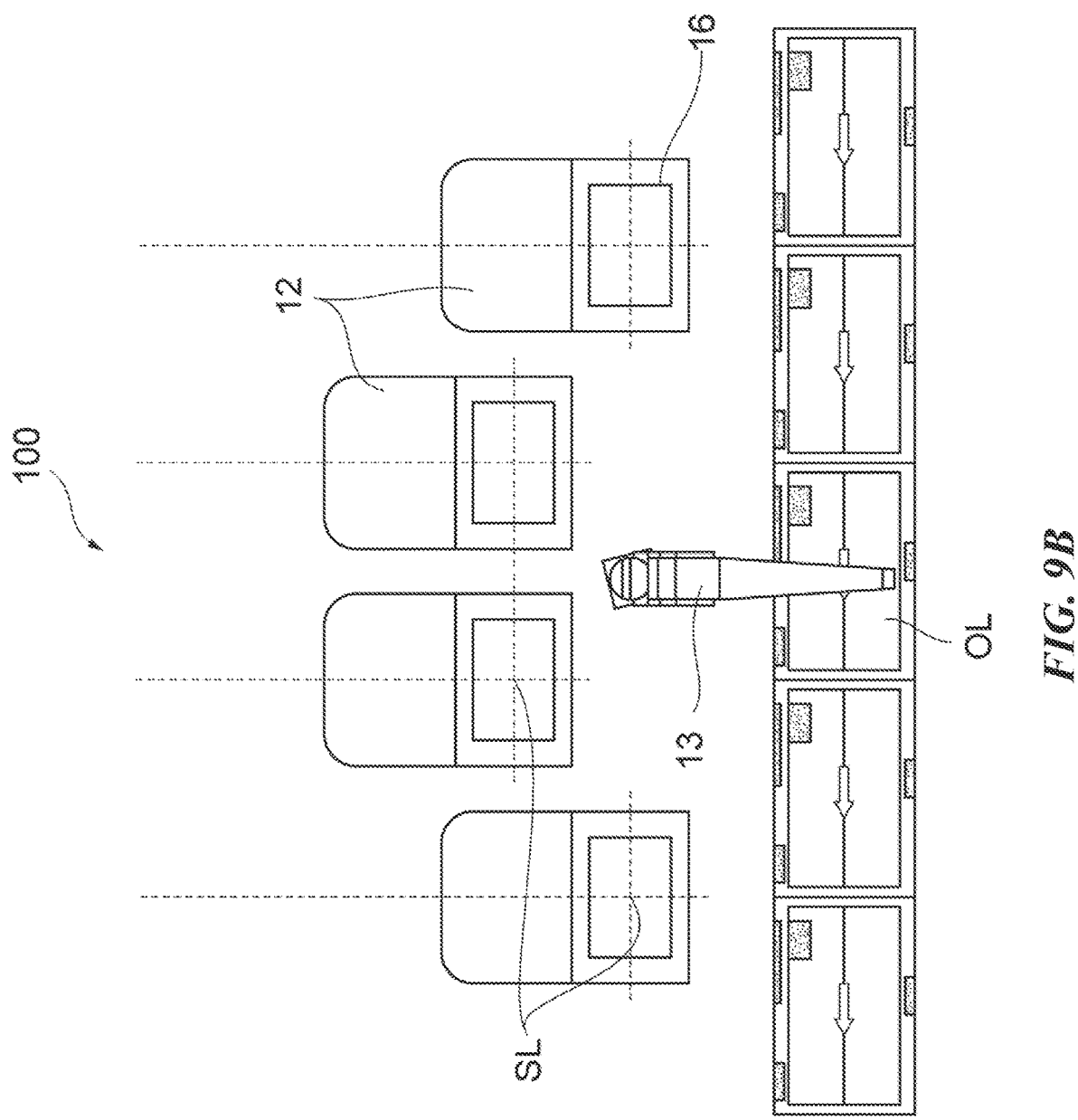
FIG. 9B is a schematic plan view showing part of the example environment in which the robot system according to the embodiment of the present technology can operate, illustrating a state of a grouping area in FIG. 9A and its surroundings.

FIG. 9B is a schematic plan view showing part of the example environment in which the robot system according to the embodiment of the present technology can operate, illustrating a state of the grouping area 103 in FIG. 9A and its surroundings. The grouping area 103 is an area in which the handling robot 13 picks up items from the container 16, transfers the items to the transfer location OL on a conveyor or the like, and/or relocates the items within the container 16. The grouping area 103 can include, for example, one or more stop locations SL at which the transport robot 12 stops, such as to move close to the handling robot 13. The stop locations SL correspond to reference positions at which one or more transport robots 12 stop while the handling robot 13 is executing a task of handling items. Also, the stop locations SL include positions at which the end effector (e.g. a gripper (such as a damper or devanning gripper) or hand) provided at the tip of the robot arm of the handling robot 13 is accessible to the container 16 on the transport robot 12.

Also, the robot system 100 can include an imaging sensor (not shown in FIGS. 9A and 9B) configured to image one or more positions. Examples of the imaging sensor include a two-dimensional/three-dimensional camera (2D/3D vision camera, such as a lidar or a radar) configured to image the container 16 in the grouping area 103 (e.g., on the transport robot 12 at the stop location SL and/or at the transfer location OL). The robot system 100 can process and use image data acquired by the imaging sensor for various purposes.

For example, the robot system 100 can process and use image data to identify items, select one or more items, grip the item, and identify the position and state (orientation, etc.) of the item. Furthermore, using the image data, the robot system 100 can calculate the quantity of items stored in the container 16 and status of the container 16 such as item-filled state or availability state of the container 16. Note that an internal state of the container 16 can be determined from the quantity of items and/or the height or the like of the items stored in the container 16.

As a more specific example, if an order including four different kinds of item is received, the controller of the robot system 100 transmits commands based on control sequences corresponding to respective operations to four different transport robots 12 adapted to pick up respective containers 16 storing respective ordered items. Each of the four transport robots 12 can come to rest at one of the stop locations SL in the grouping area 103, for example, as shown in FIG. 9B. When any of the containers 16 arrives at the grouping area 103 and the transport robot 12 come to rest at the stop location SL as shown in FIGS. 9A and 9B, the container 16 functions as an item delivery container or an item receiving container.

Then, by maneuvering the handling robot 13, the robot system 100 can, for example, pick up ordered items from the containers 16 and transfer the ordered items to the shipment container or transfer conveyor corresponding to the order. Furthermore, the robot system 100 can include one or more units (e.g., a conveyor, container sealing robot, loading robot, and shipping vehicle; not shown) configured to place the shipment container, for example, in a shipping location such as on a loading bay.

Note that whereas in the above description of the robot system 100, execution of tasks related to shipping (shipment) of items has mainly been described, to execute tasks related to warehousing of items or replenishment with items, basically a control sequence that reverses the above procedures is created or acquired, and the tasks are executed based on the control sequence.

Another Application Example 2

Figure 10A:
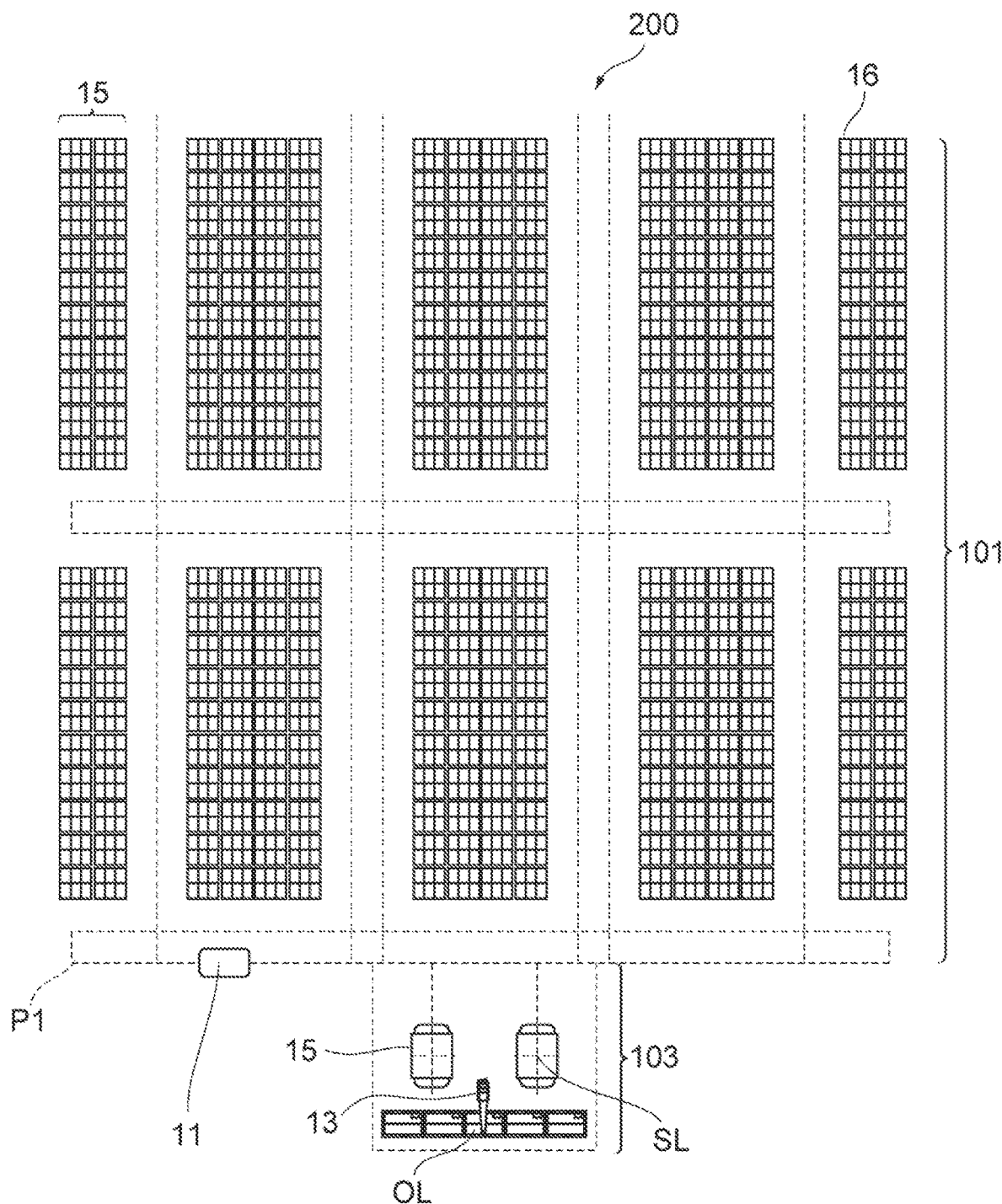
FIG. 10A is a schematic plan view showing another example environment in which a robot system according to one embodiment of the present technology can operate.
Figure 10B:
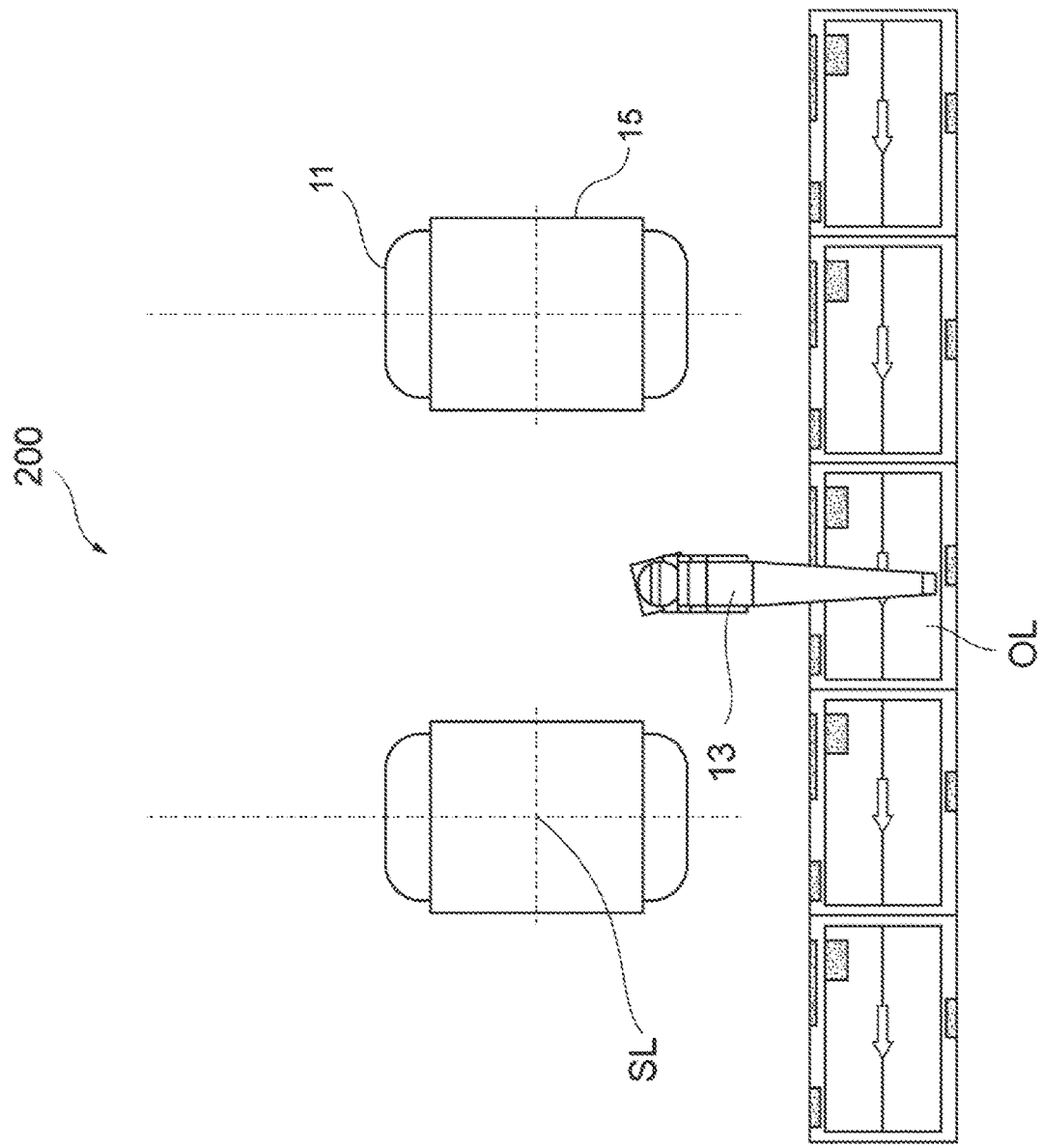
FIG. 10B is a schematic plan view showing the other example environment in which the robot system according to the embodiment of the present technology can operate, illustrating a state of a grouping area in FIG. 10A and its surroundings.

FIGS. 10A and 10B are schematic plan views showing another example environment in which a robot system according to one embodiment of the present technology can operate, where FIG. 10B illustrates a state of the grouping area 103 in FIG. 10A and its surroundings. The robot system 200 according to the present embodiment has a structure similar to the robot system 100 shown in FIGS. 9A and 9B except that items are stored directly on shelf boards of shelves 15 rather in the container 16 on a shelf. In this way, the robot system 200 can be regarded as an example in which the objects according to the present technology are targeted/processed items themselves and is subject to direct storage or removal relative to a shelf for the replenishment process P20 and shipping process P30 shown in FIG. 1.

That is, the robot system 200 does not need to include the transport robot 12 serving as a transport unit in the robot system 100, and consequently, the transport robots 11 picking up shelves 15 by accessing the storage area 101 can move along the first path P1, transport the shelves 15 to the grouping area 103, and come to rest at the stop locations SL near the handling robot 13. When the shelves 15 arrive at the grouping area 103 and the transport robots 11 come to rest at the stop locations SL as shown in FIGS. 10A and 10B, the shelves 15 function as item delivery containers or item receiving containers.

Then, by maneuvering the handling robot 13, the robot system 200 can, for example, pick up ordered items from the shelves 15 and transfer the ordered items to the shipment container and the like corresponding to the order. Furthermore, the robot system 200 can include one or more units (e.g., a conveyor, container sealing robot, loading robot, and shipping vehicle; not shown) configured to place the shipment container and the like, for example, in a shipping location such as on a loading bay.

The robot system 200 configured and controlled in this way can omit the transport robot 12, transportation area 102, and second path P2 of the robot system 100, and thus save space and improve operating efficiency. Note that shipping implementations are used above to describe the robot system 200 a control sequence for operating the robot system 200 can be reversed, such as for warehousing/replenishing items.

Whereas embodiments have been described above as examples of the present technology, the above descriptions are merely examples of the present technology in all respects and are intended to facilitate the understanding of the present invention, but are not to be interpreted as limiting the present invention. Besides, needless to say, various improvements and modifications can be made without departing from the scope of the present technology, and the components of the embodiments as well as the arrangements, materials, conditions, shapes, sizes, and the like of the components are not limited to those illustrated above or specific ones, and may be changed as appropriate.

In other words, embodiments of the present technology do not exclude other configurations, or limit the present technology to the above embodiments. Modified forms equivalent to the embodiments of the present technology can be implemented within the scope of the present technology. For example, processes, steps, routines, or blocks can be carried out in different orders in alternative embodiments within the scope of the present technology, and some processes, steps, routines, or blocks, may be deleted, moved, added, subdivided, combined, and/or transformed within the scope of the present technology. Also, the processes, steps, routines, or blocks may be carried out by various different methods. Furthermore, even if the processes, steps, routines, or blocks are to be carried out successively in the above embodiments, the processes, steps, routines, or blocks can be carried out concurrently in some cases or may be carried out non-successively at different times. Furthermore, specific numerical figures cited herein may be different values or different ranges.

Also, being specific embodiments of the present technology, the above embodiments should not be regarded exclusively as "best conceivable modes" and may be carried out by many alternative methods. Furthermore, details of the above embodiments may be changed significantly in specific modes of implementation, but are still included in the techniques of the present technology. In addition, the specific terms used to describe specific features or aspects of the present technology are not limited to specific properties, features, or aspects, or specific embodiments which are used in the present technology and with which the terms are associated, and thus the present invention is not limited to specific meanings except as defined in the appended claims. Also, whereas the present invention is defined by an arbitrary number of claims, needless to say, various aspects are expected within the scope of the present technology.

What is claimed is:

1. A controller for a robot system including a handling robot adapted to handle a handling object for storage on a shelf, for retrieval from the shelf, or both and a transport robot adapted to transport the shelf, the controller comprising:
    a data acquisition unit adapted to acquire first data including (1) information about the handling object and (2) information about the shelf before storing or retrieving the handling object on or from the shelf;
    a data storage unit adapted to store the first data; and
    a robot control unit adapted to:
        select and transport the shelf to an access position based on the first data before storing or retrieving the handling object,
        create or acquire a control sequence for storing the handling object on the shelf or for retrieving the handling object from the shelf, and
        based on the control sequence, instruct the transport robot to execute a task of transporting the shelf to the access position and instruct the handling robot to execute a task of storing the handling object on the shelf or retrieving the handling object from the shelf;
    wherein:
    the shelf is configured such that the handling object is stored or retrieved in a lateral direction and a safety catcher for the handling object is installed in an end portion of the shelf;
    the handling robot grips the handling object from the lateral direction; and
    the robot control unit creates or acquires the control sequence such that the handling object moves over the safety catcher.

2. The controller of claim 1, wherein:
    the data acquisition unit acquires second data including the information about the handling object and the information about the shelf after the handling object is stored on the shelf or after the handling object is retrieved from the shelf; and
    the data storage unit stores the second data.

3. The controller of claim 2, wherein the robot control unit creates or acquires the control sequence based on the second data such that the handling object is placed in a concentrated manner on the shelf.

4. The controller of claim 1, wherein:
    the robot control unit instructs the handling robot to perform at least part of operations in the control sequence before the shelf reaches the access position.

5. The controller of claim 1, wherein:
    the data acquisition unit acquires relative positional information about the transport robot and the shelf; and
    the robot control unit corrects positional information about the shelf at the access position based on the relative positional information, and creates or acquires the control sequence based on the corrected positional information.

6. The controller of claim 1, wherein the data storage unit stores positional information about a plurality of the handling objects on the shelf, wherein the positional information includes a sequence of unit texts that each represent an object and sequenced to represent a two-dimensional or a three-dimensional arrangement of the represented objects on each shelf board on the shelf.

7. The controller of claim 1, wherein:
    the robot system further includes a sensor adapted to image the shelf storing the handling object;
    the handling object includes identification information that is visibly detectable; and
    the robot control unit creates or acquires the control sequence configured to store the handling object on the shelf at a pose that allows identification information to be captured by the sensor for identifying the stored handling object.

8. The controller of claim 1, wherein:
    the robot system further includes a sensor adapted to image the shelf storing the handling object; and
    the sensor images the shelf when the transport robot holding the shelf is at rest or when the transport robot holding the shelf is moving, wherein the image of the shelf is used to identify objects stored on the shelf.

9. The controller of claim 1, wherein the robot control unit is configured to update a completion status representative of the storage of the handling object on the shelf or retrieval of the handling object from the shelf being complete, wherein the completion status is updated before the storage or the retrieval of the handling object is actually finished for messaging a subsystem that directly commands the transport robot to overlap an initial portion of a subsequent operation with a terminal portion of the storage or retrieval of the handling object relative to the shelf.

10. The controller of claim 1, wherein the data acquisition unit acquires sensed or estimated information regarding the handling object, the information about the shelf, or both.

11. A system comprising:
a transport robot configured to transport a shelf from a shelf storage location to a handling location;
a handling robot configured to handle an object for storage on or retrieval from the shelf at the handling location; and
a controller communicatively coupled to the transport robot and the handling robot, the controller including:
a data acquisition unit adapted to acquire first data including (1) information about the handling object and (2) information about the shelf before storing or retrieving the handling object on or from the shelf;
a data storage unit adapted to store the first data; and
a robot control unit adapted to:
select and transport the shelf to an access position based on the first data before storing or retrieving the handling object,
create or acquire a control sequence for storing the handling object on the shelf or for retrieving the handling object from the shelf, and
based on the control sequence, instruct the transport robot to execute a task of transporting the shelf to the access position and instruct the handling robot to execute a task of storing the handling object on the shelf or for retrieving the handling object from the shelf;
wherein:
the controller is further configured to (1) identify a region related to the transport robot and the handling robot, and (2) calculate tasks based on the control sequence; and
the tasks include (1) a task related to conveyance of the shelf and handling of the handling object done by the robot system and (2) a plurality of tasks executed by the robot system across adjacent regions, overlapping regions, or both;
the shelf is configured such that the handling object is stored or retrieved in a lateral direction and a safety catcher for the handling object is installed on an end portion of the shelf;
the handling robot grips the handling object from the lateral direction; and
the robot control unit creates or acquires the control sequence such that the handling object moves over the safety catcher.

12. A computer-readable non-transitory media including instructions that, when executed by one or more processors, causes the one or more processors to perform a method, the method comprising:

acquiring first data including (1) information about the handling object and (2) information about the shelf before storing or retrieving the handling object on or from the shelf;
selecting and transporting the shelf to an access position based on the first data before storing or retrieving the handling object,
creating or acquiring a control sequence for storing the handling object on the shelf or for retrieving the handling object from the shelf, and
based on the control sequence, instructing the transport robot to execute a task of transporting the shelf to the access position and instruct the handling robot to execute a task of storing the handling object on the shelf or for retrieving the handling object from the shelf;
wherein:
the shelf is configured such that the handling object is stored or retrieved in a lateral direction and a safety catcher for the handling object is installed on an end portion of the shelf;
the handling robot grips the handling object from the lateral direction; and
the robot control unit creates or acquires the control sequence such that the handling object moves over the safety catcher.

13. A control method for a robot system including a handling robot adapted to handle a handling object for storage on a shelf, for retrieval from the shelf, or both and a transport robot adapted to transport the shelf, the control method comprising:
acquiring first data including information about the handling object and information about the shelf before storing the handling object on the shelf and/or retrieving the handling object from the shelf;
selecting the shelf having the handling object thereon or targeted to have the handling object thereon;
controlling transport of the shelf to an access position based on the first data before storing or retrieving the handling object;
creating or acquiring a control sequence for storing or retrieving the handling object on or from the shelf; and
based on the control sequence, (1) instructing the transport robot to execute a task of transporting the shelf to the access position and (2) instructing the handling robot to execute a task of storing the handling object on the shelf and/or retrieving the handling object from the shelf;
wherein:
the shelf is configured such that the handling object is stored or retrieved in a lateral direction and a safety catcher for the handling object is installed on an end portion of the shelf;
the handling robot grips the handling object from the lateral direction; and
the robot control unit creates or acquires the control sequence such that the handling object moves over the safety catcher.

14. The control method of claim 13, further comprising:
acquiring second data including information about the shelf after storing or retrieving a previous object on or from the shelf; and
storing the second data, wherein the control sequence is created or acquired based on the second data such that the handling object is placed in a concentrated manner on the shelf relative to the previous object.

15. The control method of claim 13, wherein:

the handling robot is instructed to perform at least part of operations in the control sequence before the shelf reaches the access position for overlapping an initial portion of the control sequence with placement of the shelf, and further comprising:

updating a completion status representative of completing the storage of the handling object on the shelf or the retrieval of the handling object from the shelf, wherein the completion status is updated before the storage or the retrieval of the handling object is actually finished for overlapping an initial portion of a subsequent operation with a terminal portion of the storage or retrieval of the handling object relative to the shelf.

16. The control method of claim 13, further comprising:

acquiring relative positional information about the transport robot and the shelf; and correcting positional information about the shelf at the access position based on the relative positional information, wherein the control sequence is created or acquired based on the corrected positional information.

17. The control method of claim 13, wherein:

the shelf is configured such that the handling object is stored or retrieved in a lateral direction, and a safety catcher for the handling object is installed on an end portion of the shelf; and the control sequence is configured to (1) instruct the handling robot to grip the handling object from the lateral direction and (2) move the handling object over the safety catcher.

18. The control method of claim 13, further comprising:

storing positional information about a plurality of the handling objects on the shelf, the positional information including a sequence of text to identify each object in the plurality of the handling objects and a two-dimensional or a three-dimensional arrangement or relative locations of the plurality of the handling objects on the shelf.

19. The control method of claim 13, wherein:

the handling object includes identification information that is visibly detectable;

the control sequence is configured to store the handling object on the shelf at a pose that allows identification information to be captured by the sensor for identifying the stored handling object;

further comprising:

imaging the shelf when the transport robot holding the shelf is at rest or when the transport robot holding the shelf is moving; and identifying the handling object on the shelf based on the image of the shelf.

* * * * *